United States Patent
Boulware et al.

(10) Patent No.: US 10,522,055 B2
(45) Date of Patent: Dec. 31, 2019

(54) SYSTEM FOR CHARACTERIZING MANUAL WELDING OPERATIONS

(71) Applicant: Lincoln Global, Inc., Santa Fe Springs, CA (US)

(72) Inventors: Paul Christopher Boulware, Columbus, OH (US); Christopher C. Conrardy, Columbus, OH (US); Douglas A. Clark, Columbus, OH (US); M. William Forquer, Columbus, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 0 days.

(21) Appl. No.: 16/439,959

(22) Filed: Jun. 13, 2019

(65) Prior Publication Data

US 2019/0295442 A1    Sep. 26, 2019

Related U.S. Application Data

(60) Continuation of application No. 16/021,576, filed on Jun. 28, 2018, now Pat. No. 10,347,154, which is a
(Continued)

(51) Int. Cl.
*G09B 19/24* (2006.01)
*B23K 9/095* (2006.01)
(Continued)

(52) U.S. Cl.
CPC ............ *G09B 19/24* (2013.01); *B23K 9/0956* (2013.01); *B23K 9/10* (2013.01); *G09B 5/02* (2013.01)

(58) Field of Classification Search
CPC . G09B 19/24; G09B 9/00; B23K 9/32; B23K 9/0956; G05B 2219/45135
See application file for complete search history.

(56) References Cited

U.S. PATENT DOCUMENTS 317,063 A    5/1885  Wittenstrom
428,459 A    5/1890  Coffin
(Continued)

FOREIGN PATENT DOCUMENTS

CA    2698078    9/2011
CN    1665633    9/2005
(Continued)

OTHER PUBLICATIONS

SIMFOR / CESOL, "RV-SOLD" Welding Simulator, Technical and Functional Features, 20 pages, date unknown.
(Continued)

*Primary Examiner* — Jerry-Daryl Fletcher
(74) *Attorney, Agent, or Firm* — Calfee, Halter & Griswold LLP

(57) ABSTRACT

A system for characterizing manual welding exercises and providing valuable training to welders that includes components for generating, capturing, and processing data. The data generating component further includes a fixture, workpiece, at least one calibration devices each having at least two point markers integral therewith, and a welding tool. The data capturing component further includes an imaging system for capturing images of the point markers and the data processing component is operative to receive information from the data capturing component and perform various position and orientation calculations.

17 Claims, 11 Drawing Sheets

Related U.S. Application Data division of application No. 15/077,532, filed on Mar. 22, 2016, now Pat. No. 10,068,495, which is a continuation of application No. 14/293,700, filed on Jun. 2, 2014, now Pat. No. 9,773,429, which is a continuation-in-part of application No. 13/543,240, filed on Jul. 6, 2012, now Pat. No. 9,221,117, which is a continuation-in-part of application No. 12/966,570, filed on Dec. 13, 2010, now Pat. No. 9,230,449, and a continuation-in-part of application No. 12/499,687, filed on Jul. 8, 2009, now abandoned, said application No. 12/966,570 is a continuation-in-part of application No. 12/499,687, filed on Jul. 8, 2009, now abandoned, application No. 16/439,959, which is a continuation of application No. 16/021,576, filed on Jun. 28, 2018, now Pat. No. 10,347,154, which is a division of application No. 15/077,532, filed on Mar. 22, 2016, now Pat. No. 10,068,495, which is a continuation of application No. 14/293,826, filed on Jun. 2, 2014, now abandoned, which is a continuation-in-part of application No. 13/543,240, filed on Jul. 6, 2012, now Pat. No. 9,221,117, which is a continuation-in-part of application No. 12/966,570, filed on Dec. 13, 2010, now Pat. No. 9,230,449, and a continuation-in-part of application No. 12/499,687, filed on Jul. 8, 2009, now abandoned, said application No. 12/966,570 is a continuation of application No. 12/499,687, filed on Jul. 8, 2009, now abandoned.

(51) Int. Cl.
*G09B 5/02* (2006.01)
*B23K 9/10* (2006.01)

(56) References Cited

U.S. PATENT DOCUMENTS

| | | |
|---|---|---|
| 483,428 A | 9/1892 | Goppin |
| 1,159,119 A | 11/1915 | Springer |
| 1,286,529 A | 12/1918 | Cave |
| 2,326,944 A | 8/1943 | Holand et al. |
| 2,333,192 A | 11/1943 | Mobert |
| D140,630 S | 3/1945 | Garibay |
| D142,377 S | 9/1945 | Dunn |
| D152,049 S | 12/1948 | Welch |
| 2,681,969 A | 6/1954 | Burke |
| D174,208 S | 3/1955 | Abidgaard |
| 2,728,838 A | 12/1955 | Barnes |
| D176,942 S | 2/1956 | Cross |
| 2,894,086 A | 7/1959 | Rizer |
| 3,035,155 A | 5/1962 | Hawk |
| 3,059,519 A | 10/1962 | Stanton |
| 3,356,823 A | 12/1967 | Waters et al. |
| 3,555,239 A | 1/1971 | Kerth |
| 3,562,927 A | 2/1971 | Moskowitz |
| 3,562,928 A | 2/1971 | Schmitt |
| 3,621,177 A | 11/1971 | McPherson et al. |
| 3,654,421 A | 4/1972 | Streetman et al. |
| 3,690,020 A | 9/1972 | McBratnie |
| 3,739,140 A | 6/1973 | Rotilio |
| 3,852,917 A | 12/1974 | McKown |
| 3,866,011 A | 2/1975 | Cole |
| 3,867,769 A | 2/1975 | Schow et al. |
| 3,904,845 A | 9/1975 | Minkiewicz |
| 3,988,913 A | 11/1976 | Metcalfe et al. |
| D243,459 S | 2/1977 | Bliss |
| 4,024,371 A | 5/1977 | Drake |
| 4,041,615 A | 8/1977 | Whitehill |
| D247,421 S | 3/1978 | Driscoll |
| 4,124,944 A | 11/1978 | Blair |
| 4,132,014 A | 1/1979 | Schow |
| 4,237,365 A | 12/1980 | Lambros et al. |
| 4,280,041 A | 7/1981 | Kiessling et al. |
| 4,280,137 A | 7/1981 | Ashida et al. |
| 4,314,125 A | 2/1982 | Nakamura |
| 4,354,087 A | 10/1982 | Osterlitz |
| 4,359,622 A | 11/1982 | Dostoomian et al. |
| 4,375,026 A | 2/1983 | Kearney |
| 4,410,787 A | 10/1983 | Kremers et al. |
| 4,429,266 A | 1/1984 | Traadt |
| 4,452,589 A | 6/1984 | Denison |
| D275,292 S | 8/1984 | Bouman |
| D277,761 S | 2/1985 | Korovin et al. |
| 4,525,619 A | 6/1985 | Ide et al. |
| D280,329 S | 8/1985 | Bouman |
| 4,555,614 A | 11/1985 | Morris et al. |
| 4,611,111 A | 9/1986 | Baheti et al. |
| 4,616,326 A | 10/1986 | Meier et al. |
| 4,629,860 A | 12/1986 | Lindborn |
| 4,677,277 A | 6/1987 | Cook et al. |
| 4,680,014 A | 7/1987 | Paton et al. |
| 4,689,021 A | 8/1987 | Vasiliev et al. |
| 4,707,582 A | 11/1987 | Beyer |
| 4,716,273 A | 12/1987 | Paton et al. |
| D297,704 S | 9/1988 | Bulow |
| 4,812,614 A | 3/1989 | Wang et al. |
| 4,867,685 A | 9/1989 | Brush et al. |
| 4,877,940 A | 10/1989 | Bangs et al. |
| 4,897,521 A | 1/1990 | Burr |
| 4,907,973 A | 3/1990 | Hon |
| 4,931,018 A | 6/1990 | Herbst et al. |
| 4,973,814 A | 11/1990 | Kojima |
| 4,998,050 A | 3/1991 | Nishiyama et al. |
| 5,034,593 A | 7/1991 | Rice et al. |
| 5,061,841 A | 10/1991 | Richardson |
| 5,089,914 A | 2/1992 | Prescott |
| 5,192,845 A | 3/1993 | Kirmsse et al. |
| 5,206,472 A | 4/1993 | Myking et al. |
| 5,266,930 A | 11/1993 | Ichikawa et al. |
| 5,283,418 A | 2/1994 | Bellows et al. |
| 5,285,916 A | 2/1994 | Ross |
| 5,288,968 A | 2/1994 | Cecil |
| 5,305,183 A | 4/1994 | Teynor |
| 5,320,538 A | 6/1994 | Baum |
| 5,337,611 A | 8/1994 | Fleming et al. |
| 5,360,156 A | 11/1994 | Ishizaka et al. |
| 5,360,960 A | 11/1994 | Shirk |
| 5,362,962 A | 11/1994 | Barborak et al. |
| 5,370,071 A | 12/1994 | Ackermann |
| D359,296 S | 6/1995 | Witherspoon |
| 5,424,634 A | 6/1995 | Goldfarb et al. |
| 5,436,638 A | 7/1995 | Bolas et al. |
| 5,464,957 A | 11/1995 | Kidwell et al. |
| 5,465,037 A | 11/1995 | Huissoon et al. |
| D365,583 S | 12/1995 | Viken |
| 5,493,093 A | 2/1996 | Cecil et al. |
| 5,547,052 A | 8/1996 | Latshaw |
| 5,562,843 A | 10/1996 | Yasumoto |
| 5,662,822 A | 9/1997 | Tada et al. |
| 5,670,071 A | 9/1997 | Tomoyuki et al. |
| 5,676,503 A | 10/1997 | Lang |
| 5,676,867 A | 10/1997 | Van Allen |
| 5,708,253 A | 1/1998 | Bloch et al. |
| 5,710,405 A | 1/1998 | Solomon et al. |
| 5,719,369 A | 2/1998 | White et al. |
| D392,534 S | 3/1998 | Degen et al. |
| 5,728,991 A | 3/1998 | Takada et al. |
| 5,751,258 A | 5/1998 | Fergason et al. |
| D395,296 S | 6/1998 | Kaya et al. |
| 5,774,110 A | 6/1998 | Edelson |
| D396,238 S | 7/1998 | Schmitt |
| 5,781,258 A | 7/1998 | Debral et al. |
| 5,823,785 A | 10/1998 | Matherne, Jr. |
| 5,835,077 A | 11/1998 | Dao et al. |
| 5,835,277 A | 11/1998 | Hegg |
| 5,845,053 A | 12/1998 | Watanabe et al. |
| 5,877,777 A | 3/1999 | Colwell |
| 5,963,891 A | 10/1999 | Walker et al. |
| 6,008,470 A | 12/1999 | Zhang et al. |
| 6,037,948 A | 3/2000 | Liepa |
| 6,049,059 A | 4/2000 | Kim |

(56) References Cited

U.S. PATENT DOCUMENTS

| | | |
|---|---|---|
| 6,051,805 A | 4/2000 | Vaidya et al. |
| 6,114,645 A | 9/2000 | Burgess |
| 6,155,475 A | 12/2000 | Ekelof et al. |
| 6,155,928 A | 12/2000 | Burdick |
| 6,230,327 B1 | 5/2001 | Briand et al. |
| 6,236,013 B1 | 5/2001 | Delzenne et al. |
| 6,236,017 B1 | 5/2001 | Smartt et al. |
| 6,242,711 B1 | 6/2001 | Cooper |
| 6,271,500 B1 | 8/2001 | Hirayam et al. |
| 6,301,763 B1 | 10/2001 | Pryor |
| 6,330,938 B1 | 12/2001 | Herve et al. |
| 6,330,966 B1 | 12/2001 | Eissfeller |
| 6,331,848 B1 | 12/2001 | Stove et al. |
| D456,428 S | 4/2002 | Aronson et al. |
| 6,373,465 B2 | 4/2002 | Jolly et al. |
| 6,377,011 B1 | 4/2002 | Ben-Ur |
| D456,828 S | 5/2002 | Aronson et al. |
| 6,396,232 B2 | 5/2002 | Haanpaa et al. |
| D461,383 S | 8/2002 | Blackburn |
| 6,427,352 B1 | 8/2002 | Pfeiffer et al. |
| 6,441,342 B1 | 8/2002 | Hsu |
| 6,445,964 B1 | 9/2002 | White et al. |
| 6,492,618 B1 | 12/2002 | Flood et al. |
| 6,506,997 B2 | 1/2003 | Matsuyama |
| 6,552,303 B1 | 4/2003 | Blankenship |
| 6,560,029 B1 | 5/2003 | Dobbie et al. |
| 6,563,489 B1 | 5/2003 | Latypov et al. |
| 6,568,846 B1 | 5/2003 | Cote et al. |
| D475,726 S | 6/2003 | Suga et al. |
| 6,572,379 B1 | 6/2003 | Sears et al. |
| 6,583,386 B1 | 6/2003 | Ivkovich |
| 6,593,540 B1 | 7/2003 | Baker |
| 6,621,049 B2 | 9/2003 | Suzuki |
| 6,624,388 B1 | 9/2003 | Blankenship |
| D482,171 S | 11/2003 | Vui et al. |
| 6,647,288 B2 | 11/2003 | Madill et al. |
| 6,649,858 B2 | 11/2003 | Wakeman |
| 6,655,645 B1 | 12/2003 | Lu et al. |
| 6,660,965 B2 | 12/2003 | Simpson |
| 6,679,702 B1 | 1/2004 | Rau |
| 6,697,701 B2 | 2/2004 | Hillen et al. |
| 6,697,770 B1 | 2/2004 | Nagetgaal |
| 6,703,585 B2 | 3/2004 | Suzuki |
| 6,708,385 B1 | 3/2004 | Lemelson |
| 6,710,298 B2 | 3/2004 | Eriksson |
| 6,710,299 B2 | 3/2004 | Blankenship et al. |
| 6,715,502 B1 | 4/2004 | Rome et al. |
| D490,347 S | 5/2004 | Meyers |
| 6,730,875 B2 | 5/2004 | Hsu |
| 6,734,393 B1 | 5/2004 | Friedl et al. |
| 6,744,011 B1 | 6/2004 | Hu et al. |
| 6,750,428 B2 | 6/2004 | Okamoto et al. |
| 6,765,584 B1 | 7/2004 | Matthias |
| 6,772,802 B2 | 8/2004 | Few |
| 6,788,442 B1 | 9/2004 | Potin et al. |
| 6,795,778 B2 | 9/2004 | Dodge et al. |
| 6,798,974 B1 | 9/2004 | Nakano et al. |
| 6,857,553 B1 | 2/2005 | Hartman et al. |
| 6,858,817 B2 | 2/2005 | Blankenship et al. |
| 6,865,926 B2 | 3/2005 | O'Brien et al. |
| D504,449 S | 4/2005 | Butchko |
| 6,920,371 B2 | 7/2005 | Hillen et al. |
| 6,940,039 B2 | 9/2005 | Blankenship et al. |
| 6,982,700 B2 | 1/2006 | Rosenberg et al. |
| 7,021,937 B2 | 4/2006 | Simpson et al. |
| 7,024,342 B1 | 4/2006 | Waite |
| 7,110,859 B2 | 9/2006 | Shibata et al. |
| 7,126,078 B2 | 10/2006 | Demers et al. |
| 7,132,617 B2 | 11/2006 | Lee et al. |
| 7,170,032 B2 | 1/2007 | Flood |
| 7,194,447 B2 | 3/2007 | Harvey |
| 7,233,837 B2 | 6/2007 | Swain et al. |
| 7,247,814 B2 | 7/2007 | Ott |
| D555,446 S | 11/2007 | Picaza Ibarrondo |
| 7,298,535 B2 | 11/2007 | Kuutti |
| 7,315,241 B1 | 1/2008 | Daily et al. |
| D561,973 S | 2/2008 | Kinsley et al. |
| 7,353,715 B2 | 4/2008 | Myers |
| 7,363,137 B2 | 4/2008 | Brant et al. |
| 7,375,304 B2 | 5/2008 | Kainec et al. |
| 7,381,923 B2 | 6/2008 | Gordon et al. |
| 7,414,595 B1 | 8/2008 | Muffler |
| 7,465,230 B2 | 12/2008 | Lemay et al. |
| 7,474,760 B2 | 1/2009 | Hertzman et al. |
| 7,478,108 B2 | 1/2009 | Townsend et al. |
| D587,975 S | 3/2009 | Aronson et al. |
| 7,487,018 B2 | 4/2009 | Lee et al. |
| 7,516,022 B2 | 4/2009 | Lee et al. |
| 7,580,821 B2 | 8/2009 | Schirm |
| D602,057 S | 10/2009 | Osicki |
| 7,621,171 B2 | 11/2009 | O'Brien |
| D606,102 S | 12/2009 | Bender et al. |
| 7,643,890 B1 | 1/2010 | Hillen et al. |
| 7,687,741 B2 | 3/2010 | Kainec et al. |
| D614,217 S | 4/2010 | Peters et al. |
| D615,573 S | 5/2010 | Peters et al. |
| 7,817,162 B2 | 10/2010 | Bolick et al. |
| 7,853,645 B2 | 12/2010 | Brown et al. |
| D631,074 S | 1/2011 | Peters et al. |
| 7,874,921 B2 | 1/2011 | Baszucki et al. |
| 7,970,172 B1 | 6/2011 | Hendrickson |
| 7,972,129 B2 | 7/2011 | O'Dononghue |
| 7,991,587 B2 | 8/2011 | Ihn |
| 8,069,017 B2 | 11/2011 | Hallquist |
| 8,224,881 B1 | 7/2012 | Spear et al. |
| 8,248,324 B2 | 8/2012 | Nangle |
| 8,265,886 B2 | 9/2012 | Bisiaux et al. |
| 8,274,013 B2 | 9/2012 | Wallace |
| 8,287,522 B2 | 10/2012 | Moses et al. |
| 8,301,286 B2 | 10/2012 | Babu |
| 8,316,462 B2 | 11/2012 | Becker et al. |
| 8,363,048 B2 | 1/2013 | Gering |
| 8,365,603 B2 | 2/2013 | Lesage et al. |
| 8,512,043 B2 | 8/2013 | Choquet |
| 8,569,646 B2 | 10/2013 | Daniel et al. |
| 8,592,723 B2 | 11/2013 | Davidson et al. |
| 8,657,605 B2 | 2/2014 | Wallace et al. |
| 8,692,157 B2 | 4/2014 | Daniel et al. |
| 8,747,116 B2 | 6/2014 | Zboray et al. |
| 8,777,629 B2 | 7/2014 | Kreindl et al. |
| 8,787,051 B2 | 7/2014 | Chang et al. |
| 8,834,168 B2 | 9/2014 | Peters et al. |
| 8,851,896 B2 | 10/2014 | Wallace et al. |
| 8,911,237 B2 | 12/2014 | Postlewaite et al. |
| 8,915,740 B2 | 12/2014 | Zboray et al. |
| RE45,398 E | 3/2015 | Wallace |
| 8,992,226 B1 | 3/2015 | Leach et al. |
| 9,011,154 B2 | 4/2015 | Kindig et al. |
| 9,293,056 B2 | 3/2016 | Zboray et al. |
| 9,293,057 B2 | 3/2016 | Zboray et al. |
| 9,779,635 B2 | 10/2017 | Zboray et al. |
| 9,836,987 B2 | 12/2017 | Postlethwaite et al. |
| 2001/0045808 A1 | 11/2001 | Heitmann et al. |
| 2001/0052893 A1 | 12/2001 | Jolly et al. |
| 2002/0032553 A1 | 3/2002 | Simpson et al. |
| 2002/0039138 A1 | 4/2002 | Edelson et al. |
| 2002/0046999 A1 | 4/2002 | Veikkolainen et al. |
| 2002/0005421 A1 | 5/2002 | Edelson et al. |
| 2002/0050984 A1 | 5/2002 | Roberts |
| 2002/0085843 A1 | 7/2002 | Mann |
| 2002/0094026 A1 | 7/2002 | Edelson et al. |
| 2002/0098468 A1 | 7/2002 | Barrett et al. |
| 2002/0111557 A1 | 8/2002 | Madill et al. |
| 2002/0132213 A1 | 9/2002 | Grant et al. |
| 2002/0135695 A1 | 9/2002 | Edelson et al. |
| 2002/0175897 A1 | 11/2002 | Pelosi |
| 2002/0178038 A1 | 11/2002 | Grybas |
| 2002/0180761 A1 | 12/2002 | Edelson |
| 2003/0000931 A1 | 1/2003 | Ueda et al. |
| 2003/0002740 A1 | 1/2003 | Melikian |
| 2003/0023592 A1 | 1/2003 | Modica et al. |
| 2003/0025884 A1 | 2/2003 | Hamana et al. |
| 2003/0062354 A1 | 4/2003 | Ward |
| 2003/0075534 A1 | 4/2003 | Okamoto |

(56) References Cited

U.S. PATENT DOCUMENTS

| | | |
|---|---|---|
| 2003/0106787 A1 | 6/2003 | Santilli |
| 2003/0111451 A1 | 6/2003 | Blankenship et al. |
| 2003/0172032 A1 | 9/2003 | Choquet |
| 2003/0186199 A1 | 10/2003 | McCool et al. |
| 2003/0228560 A1 | 12/2003 | Seat et al. |
| 2003/0234885 A1 | 12/2003 | Pilu |
| 2004/0009462 A1 | 1/2004 | McElwrath |
| 2004/0020907 A1 | 2/2004 | Zauner et al. |
| 2004/0035990 A1 | 2/2004 | Ackeret |
| 2004/0050824 A1 | 3/2004 | Samler |
| 2004/0088071 A1 | 5/2004 | Kouno |
| 2004/0140301 A1 | 7/2004 | Blankenship et al. |
| 2004/0167788 A1 | 8/2004 | Birimisa et al. |
| 2004/0181382 A1 | 9/2004 | Hu |
| 2005/0007504 A1 | 1/2005 | Fergason |
| 2005/0017152 A1 | 1/2005 | Fergason |
| 2005/0029326 A1 | 2/2005 | Henrikson |
| 2005/0046584 A1 | 3/2005 | Breed |
| 2005/0050168 A1 | 3/2005 | Wen et al. |
| 2005/0101767 A1 | 5/2005 | Clapham et al. |
| 2005/0103766 A1 | 5/2005 | Iizuka et al. |
| 2005/0103767 A1 | 5/2005 | Kainec et al. |
| 2005/0103768 A1 | 5/2005 | Ward |
| 2005/0109735 A1 | 5/2005 | Flood |
| 2005/0128186 A1 | 6/2005 | Shahoian et al. |
| 2005/0133488 A1 | 6/2005 | Blankenship |
| 2005/0159840 A1 | 7/2005 | Lin et al. |
| 2005/0163364 A1 | 7/2005 | Beck |
| 2005/0189336 A1 | 9/2005 | Ku |
| 2005/0199602 A1 | 9/2005 | Kaddani et al. |
| 2005/0230573 A1 | 10/2005 | Ligertwood |
| 2005/0233295 A1 | 10/2005 | Chiszar et al. |
| 2005/0252897 A1 | 11/2005 | Hsu et al. |
| 2005/0275913 A1 | 12/2005 | Vesely et al. |
| 2005/0275914 A1 | 12/2005 | Vesely et al. |
| 2006/0014130 A1 | 1/2006 | Weinstein |
| 2006/0076321 A1 | 4/2006 | Maev |
| 2006/0136183 A1 | 6/2006 | Choquet |
| 2006/0140502 A1 | 6/2006 | Tseng et al. |
| 2006/0154226 A1 | 7/2006 | Maxfield |
| 2006/0163227 A1 | 7/2006 | Hillen et al. |
| 2006/0163228 A1 | 7/2006 | Daniel |
| 2006/0166174 A1 | 7/2006 | Rowe |
| 2006/0169682 A1 | 8/2006 | Kainec et al. |
| 2006/0173619 A1 | 8/2006 | Brant et al. |
| 2006/0189260 A1 | 8/2006 | Sung |
| 2006/0207980 A1 | 9/2006 | Jacovetty et al. |
| 2006/0213892 A1 | 9/2006 | Ott |
| 2006/0214924 A1 | 9/2006 | Kawamoto et al. |
| 2006/0226137 A1 | 10/2006 | Huismann et al. |
| 2006/0241432 A1 | 10/2006 | Herline et al. |
| 2006/0252543 A1 | 11/2006 | Van Noland et al. |
| 2006/0258447 A1 | 11/2006 | Baszucki et al. |
| 2007/0034611 A1 | 2/2007 | Drius et al. |
| 2007/0038400 A1 | 2/2007 | Lee et al. |
| 2007/0045488 A1 | 3/2007 | Shin |
| 2007/0088536 A1 | 4/2007 | Ishikawa |
| 2007/0112889 A1 | 5/2007 | Cook et al. |
| 2007/0164007 A1 | 7/2007 | Peters et al. |
| 2007/0188606 A1 | 8/2007 | Atkinson et al. |
| 2007/0198117 A1 | 8/2007 | Wajihuddin |
| 2007/0211026 A1 | 9/2007 | Ohta et al. |
| 2007/0221797 A1 | 9/2007 | Thompson et al. |
| 2007/0256503 A1 | 11/2007 | Wong et al. |
| 2007/0264620 A1 | 11/2007 | Maddix et al. |
| 2007/0277611 A1 | 12/2007 | Portzgen et al. |
| 2007/0291035 A1 | 12/2007 | Vesely et al. |
| 2008/0021311 A1 | 1/2008 | Goldbach |
| 2008/0027594 A1 | 1/2008 | Jump et al. |
| 2008/0031774 A1 | 2/2008 | Magnant et al. |
| 2008/0038702 A1 | 2/2008 | Choquet |
| 2008/0061049 A1 | 3/2008 | Albrecht |
| 2008/0078811 A1 | 4/2008 | Hillen et al. |
| 2008/0078812 A1 | 4/2008 | Peters et al. |
| 2008/0107345 A1 | 5/2008 | Melikian |
| 2008/0117203 A1 | 5/2008 | Gering |
| 2008/0120075 A1 | 5/2008 | Wloka |
| 2008/0128398 A1 | 6/2008 | Schneider |
| 2008/0135533 A1 | 6/2008 | Ertmer et al. |
| 2008/0140815 A1 | 6/2008 | Brant et al. |
| 2008/0149686 A1 | 6/2008 | Daniel et al. |
| 2008/0203075 A1 | 8/2008 | Feldhausen et al. |
| 2008/0233550 A1 | 9/2008 | Solomon |
| 2008/0249998 A1 | 10/2008 | Dettinger et al. |
| 2008/0303197 A1 | 12/2008 | Paquette et al. |
| 2008/0314887 A1 | 12/2008 | Stoger et al. |
| 2009/0015585 A1 | 1/2009 | Klusza |
| 2009/0021514 A1 | 1/2009 | Klusza |
| 2009/0045183 A1 | 2/2009 | Artelsmair et al. |
| 2009/0050612 A1 | 2/2009 | Serruys et al. |
| 2009/0057286 A1 | 3/2009 | Ihara et al. |
| 2009/0109128 A1 | 4/2009 | Nangle |
| 2009/0152251 A1 | 6/2009 | Dantinne et al. |
| 2009/0173726 A1 | 7/2009 | Davidson et al. |
| 2009/0184098 A1 | 7/2009 | Daniel et al. |
| 2009/0197228 A1 | 8/2009 | Afshar et al. |
| 2009/0200281 A1 | 8/2009 | Hampton |
| 2009/0200282 A1 | 8/2009 | Hampton |
| 2009/0231423 A1 | 9/2009 | Becker et al. |
| 2009/0257655 A1 | 10/2009 | Melikian |
| 2009/0259444 A1 | 10/2009 | Dolansky et al. |
| 2009/0298024 A1 | 12/2009 | Batzler et al. |
| 2009/0312958 A1 | 12/2009 | Dai et al. |
| 2009/0325699 A1 | 12/2009 | Delgiannidis |
| 2010/0012017 A1 | 1/2010 | Miller |
| 2010/0012637 A1 | 1/2010 | Jaeger |
| 2010/0021051 A1 | 1/2010 | Melikian |
| 2010/0048273 A1 | 2/2010 | Wallace et al. |
| 2010/0062405 A1 | 3/2010 | Zboray et al. |
| 2010/0062406 A1 | 3/2010 | Zboray et al. |
| 2010/0096373 A1 | 4/2010 | Hillen et al. |
| 2010/0121472 A1 | 5/2010 | Babu et al. |
| 2010/0133247 A1 | 6/2010 | Mazumder et al. |
| 2010/0133250 A1 | 6/2010 | Sardy et al. |
| 2010/0176107 A1 | 7/2010 | Bong |
| 2010/0201803 A1 | 8/2010 | Melikian |
| 2010/0224610 A1 | 9/2010 | Wallace |
| 2010/0276396 A1 | 11/2010 | Cooper |
| 2010/0299101 A1 | 11/2010 | Shimada et al. |
| 2010/0307249 A1 | 12/2010 | Lesage et al. |
| 2010/0314362 A1 | 12/2010 | Albrecht |
| 2010/0326962 A1 | 12/2010 | Calla et al. |
| 2011/0006047 A1 | 1/2011 | Penrod |
| 2011/0048273 A1 | 3/2011 | Colon |
| 2011/0052046 A1 | 3/2011 | Melikian |
| 2011/0060568 A1 | 3/2011 | Goldfine |
| 2011/0082728 A1 | 4/2011 | Melikian |
| 2011/0091846 A1 | 4/2011 | Kreindl et al. |
| 2011/0114615 A1 | 5/2011 | Daniel et al. |
| 2011/0116076 A1 | 5/2011 | Chantry et al. |
| 2011/0117527 A1 | 5/2011 | Conrardy |
| 2011/0122495 A1 | 5/2011 | Togashi |
| 2011/0183304 A1 | 7/2011 | Wallace et al. |
| 2011/0187746 A1 | 8/2011 | Suto et al. |
| 2011/0187859 A1 | 8/2011 | Edelson |
| 2011/0229864 A1 | 9/2011 | Short et al. |
| 2011/0248864 A1 | 10/2011 | Becker |
| 2011/0316516 A1 | 12/2011 | Schiefermuller et al. |
| 2012/0122062 A1 | 5/2012 | Yang et al. |
| 2012/0189993 A1 | 7/2012 | Kindig et al. |
| 2012/0291172 A1 | 11/2012 | Wills et al. |
| 2012/0298640 A1 | 11/2012 | Conrardy et al. |
| 2013/0026150 A1 | 1/2013 | Chantry et al. |
| 2013/0040270 A1 | 2/2013 | Albrecht |
| 2013/0049976 A1 | 2/2013 | Maggiore |
| 2013/0075380 A1 | 3/2013 | Albrech et al. |
| 2013/0119040 A1 | 5/2013 | Suraba et al. |
| 2013/0170259 A1 | 7/2013 | Chang et al. |
| 2013/0182070 A1 | 7/2013 | Peters et al. |
| 2013/0183645 A1 | 7/2013 | Wallace et al. |
| 2013/0189657 A1 | 7/2013 | Wallace et al. |
| 2013/0189658 A1 | 7/2013 | Peters et al. |
| 2013/0203029 A1 | 8/2013 | Choquet |
| 2013/0206740 A1 | 8/2013 | Pfeifer et al. |

(56) References Cited

U.S. PATENT DOCUMENTS

| | | |
|---|---|---|
| 2013/0209976 A1 | 8/2013 | Postlethwaite et al. |
| 2013/0230832 A1 | 9/2013 | Peters et al. |
| 2013/0231980 A1 | 9/2013 | Choquet |
| 2013/0252214 A1 | 9/2013 | Eigart et al. |
| 2013/0288211 A1 | 10/2013 | Patterson et al. |
| 2013/0327747 A1 | 12/2013 | Dantinne |
| 2013/0342678 A1 | 12/2013 | McAninch et al. |
| 2014/0017642 A1 | 1/2014 | Postlethwaite et al. |
| 2014/0038143 A1 | 2/2014 | Daniel |
| 2014/0042136 A1 | 2/2014 | Daniel |
| 2014/0065584 A1 | 3/2014 | Wallace et al. |
| 2014/0134580 A1 | 5/2014 | Becker |
| 2014/0263224 A1 | 9/2014 | Becker |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2014/0312020 A1 | 10/2014 | Daniel |
| 2014/0346158 A1 | 11/2014 | Matthews |
| 2015/0056584 A1 | 2/2015 | Boulware et al. |
| 2015/0056585 A1 | 2/2015 | Boulware et al. |
| 2015/0056586 A1 | 2/2015 | Penrod |
| 2015/0072323 A1 | 3/2015 | Postlethwaite et al. |
| 2015/0125836 A1 | 5/2015 | Daniel |
| 2015/0194073 A1 | 7/2015 | Becker et al. |
| 2015/0235565 A1 | 8/2015 | Postlethwaite et al. |
| 2015/0248846 A1 | 9/2015 | Postlethwaite et al. |
| 2016/0093233 A1 | 3/2016 | Boulware et al. |
| 2016/0125763 A1 | 5/2016 | Becker |
| 2016/0203734 A1 | 7/2016 | Boulware et al. |
| 2016/0203735 A1 | 7/2016 | Boulware et al. |
| 2016/0260261 A1 | 9/2016 | Hsu |
| 2016/0331592 A1 | 11/2016 | Stewart |
| 2016/0343268 A1 | 11/2016 | Postlethwaite et al. |
| 2017/0053557 A1 | 2/2017 | Daniel |

FOREIGN PATENT DOCUMENTS

| | | |
|---|---|---|
| CN | 201083660 Y | 7/2008 |
| CN | 201149744 | 11/2008 |
| CN | 101406978 | 4/2009 |
| CN | 101419755 A1 | 4/2009 |
| CN | 201229711 Y | 4/2009 |
| CN | 101571887 A | 11/2009 |
| CN | 101587659 A | 11/2009 |
| CN | 101661589 | 3/2010 |
| CN | 102053563 | 5/2011 |
| CN | 102202836 | 9/2011 |
| CN | 202053009 | 11/2011 |
| CN | 202684308 U | 1/2013 |
| CN | 203503228 | 3/2014 |
| CN | 103871279 A | 6/2014 |
| DE | 28 33 638 A1 | 2/1980 |
| DE | 30 46 634 A1 | 1/1984 |
| DE | 32 44 307 A1 | 5/1984 |
| DE | 35 22 581 A1 | 1/1987 |
| DE | 4037879 A1 | 6/1991 |
| DE | 196 15 069 A1 | 10/1997 |
| DE | 197 39 720 C1 | 10/1998 |
| DE | 19834205 A1 | 2/2000 |
| DE | 200 09 543 U1 | 8/2001 |
| DE | 10 2005 047 204 A1 | 4/2007 |
| DE | 102006048165 | 1/2008 |
| DE | 10 2010 038 902 A1 | 2/2012 |
| DE | 202012013151 U1 | 2/2015 |
| EP | 0008527 | 1/1982 |
| EP | 0 108 599 A1 | 5/1984 |
| EP | 0 127 299 | 12/1984 |
| EP | 0 145 891 A1 | 6/1985 |
| EP | 319623 B1 | 10/1990 |
| EP | 0852986 A1 | 7/1998 |
| EP | 1 527 852 A1 | 5/2005 |
| EP | 1905533 A2 | 4/2008 |
| ES | 2 274 736 A1 | 5/2007 |
| FR | 1456780 | 3/1965 |
| FR | 2 827 066 A1 | 1/2003 |
| FR | 2 926 660 A1 | 7/2009 |
| GB | 1 455 972 | 11/1976 |
| GB | 1 511 608 | 5/1978 |
| GB | 2 254 172 A | 9/1992 |
| GB | 2435838 A | 9/2007 |
| GB | 2 454 232 A | 5/2009 |
| JP | 2-224877 | 9/1990 |
| JP | 05-329645 | 12/1993 |
| JP | 07-047471 | 2/1995 |
| JP | 07-232270 | 9/1995 |
| JP | 08-505091 | 4/1996 |
| JP | 08-150476 | 6/1996 |
| JP | H08221107 | 8/1996 |
| JP | 08-132274 | 5/1998 |
| JP | 2000-167666 A | 6/2000 |
| JP | 2000-237872 | 9/2000 |
| JP | 2001-071140 A | 3/2001 |
| JP | 2002278670 A | 9/2002 |
| JP | 2003-200372 A | 7/2003 |
| JP | 2003-326362 A | 11/2003 |
| JP | 2004025270 | 1/2004 |
| JP | 2006-006604 A | 1/2006 |
| JP | 2006175205 | 7/2006 |
| JP | 2006-281270 A | 10/2006 |
| JP | 2007-290025 A | 11/2007 |
| JP | 2009-500178 A | 1/2009 |
| JP | 2009160636 A | 7/2009 |
| JP | 2010231792 | 10/2010 |
| JP | 2012024867 A | 2/2012 |
| JP | 2012218058 A | 11/2012 |
| KR | 100876425 | 12/2008 |
| KR | 20090010693 | 1/2009 |
| KR | 1020090111556 A | 10/2009 |
| KR | 20110068544 | 6/2011 |
| RU | 527045 | 7/1995 |
| RU | 2317183 | 2/2008 |
| RU | 2008 108 601 C1 | 11/2009 |
| SU | 1038963 A1 | 8/1983 |
| WO | 98/45078 | 10/1998 |
| WO | 0112376 A1 | 2/2001 |
| WO | 01/43910 | 6/2001 |
| WO | 0158400 A1 | 8/2001 |
| WO | 2004029549 | 4/2004 |
| WO | 2005102230 A1 | 11/2005 |
| WO | 2005110658 | 11/2005 |
| WO | 2006034571 A1 | 4/2006 |
| WO | 2007009131 | 1/2007 |
| WO | 2007039278 | 4/2007 |
| WO | 2009120921 | 1/2009 |
| WO | 2009060231 A1 | 5/2009 |
| WO | 2010020867 | 8/2009 |
| WO | 2009149740 A1 | 12/2009 |
| WO | 2010000003 A2 | 1/2010 |
| WO | 2010020870 | 2/2010 |
| WO | 2010044982 | 4/2010 |
| WO | 2010091493 A1 | 8/2010 |
| WO | 2011017608 A1 | 2/2011 |
| WO | 2011041037 A1 | 4/2011 |
| WO | 2011045654 A1 | 4/2011 |
| WO | 2011058433 | 5/2011 |
| WO | 2011059502 | 5/2011 |
| WO | 2011060350 A1 | 5/2011 |
| WO | 2011067447 A1 | 6/2011 |
| WO | 2011088412 A1 | 7/2011 |
| WO | 2011097035 A2 | 8/2011 |
| WO | 2012016851 | 2/2012 |
| WO | 2012082105 A1 | 6/2012 |
| WO | 2012137060 A1 | 10/2012 |
| WO | 2012143327 A1 | 10/2012 |
| WO | 2013014202 A1 | 1/2013 |
| WO | 2013-025672 | 2/2013 |
| WO | 2013061518 | 5/2013 |
| WO | 2013114189 A1 | 8/2013 |
| WO | 2013119749 | 8/2013 |
| WO | 2013175079 A1 | 11/2013 |
| WO | 2013186413 | 12/2013 |
| WO | 2014007830 A1 | 1/2014 |
| WO | 2014019045 A1 | 2/2014 |

(56) References Cited

FOREIGN PATENT DOCUMENTS

| WO | 2014020386 | 2/2014 |
|---|---|---|
| WO | 2014140720 | 9/2014 |
| WO | 2014184710 | 11/2014 |
| WO | 2016-137578 | 9/2016 |

OTHER PUBLICATIONS

International Search Report and Written Opinion from PCT/IB2009/006605 dated Feb. 12, 2010.

Robert Schoder, "Design and Implementation of a Video Sensor for Closed Loop Control of Back Bead Weld Puddle Width," Massachusetts, Institute of Technology, Dept. of Mechanical Engineering, May 27, 1983, 64 pages.

Hills and Steele, Jr.; "Data Parallel Algorithms", Communications of the ACM, Dec. 1986, vol. 29, No. 12, p. 1170.

Nancy C. Porter, J. Allan Cote, Timothy D. Gifford, and Wim Lam, Virtual Reality Welder Training, 29 pages, dated Jul. 14, 2006.

J.Y. (YOSH) Mantinband, Hillel Goldenberg, Llan Kleinberger, Paul Kleinberger, Autosteroscopic, field—sequential display with full freedom of movement OR Let the display were the shutter-glasses, 3ality (Israel) Ltd., 8 pages, 2002.

Fronius, ARS Electronica Linz GMBH, High-speed video technology is applied to research on welding equipment, and the results are visualized in the CAVE, 2 pages, May 18, 1997.

D.K. Aidun and S.A. Martin, "Penetration in Spot GTA Welds during Centrifugation," Journal of Material Engineering and Performance vol. 7(5), 4 pages, Oct. 1998—597.

Arc+ simulator; httl://www.123arc.com/en/depliant_ang.pdf; 2 pages, 2000.

Glen Wade, "Human uses of ultrasound: ancient and modern", Ulrasonics vol. 38, 5 pages, dated 2000.

ASME Definitions, Consumables, Welding Positions, 4 pages, dated Mar. 19, 2001. See http://www.gowelding.com/asme4.htm.

M. Abbas, F. Waeckel, Code Aster (Software) EDF (France), 14 pages, Oct. 2001.

Achim Mahrle, Jurgen Schmidt, "The influence of fluid flow phenomena on the laser beam welding process"; International Journal of Heat and Fluid Flow 23, 10 pages, dated 2002.

The Lincoln Electric Company; CheckPoint Production Monitoring brochure; four (4) pages; http://www.lincolnelectric.com/assets/en_US/products/literature/s232.pdf; Publication S2.32; 4 pages, Issue Date Feb. 2012.

International Search Report and Written Opinion from PCT/US10/60129 dated Feb. 10, 2011.

Desroches, X.; Code-Aster, Note of use for aclculations of welding; Instruction manual U2.03 booklet: Thermomechincal; Document: U2.03.05; 13 pages, Oct. 1, 2003.

Fast, K. et al., "Virtual Training for Welding", Mixed and Augmented Reality, 2004, ISMAR 2004, Third IEEE and SM International Symposium on Arlington, VA, 2 pages, Nov. 2-5, 2004.

Cooperative Research Program, Virtual Reality Welder Training, Summary Report SR 0512, 4 pages, Jul. 2005.

Porter, et al., Virtual Reality Training, Paper No. 2005-P19, 14 pages, 2005.

Eduwelding+, Weld Into the Future; Online Welding Seminar—A virtual training environment; 123arc.com; 4 pages, 2005.

Miller Electric MFG Co.; MIG Welding System features weld monitoring software; NewsRoom 2010 (Dialog® File 992); © 2011 Dialog. 2010; http://www.dialogweb.com/cgi/dwclient?reg=133233430487; three (3) pages; printed Mar. 8, 2012.

M. Abida and M. Siddique, Numerical simulation to study the effect of tack welds and root gap on welding deformations and residual stresses of a pipe-flange joint, Faculty of Mechanical Engineering, GIK Institute of Engineering Sciences and Technology, Topi, NWFP, Pakistan, 12 pages, Available on-line Aug. 25, 2005.

Abbas, M. et al. .; Code_Aster; Introduction to Code_Aster; User Manual; Booklet U1.0-: Introduction to Code_Aster; Document: U1.02.00; Version 7.4; 14 pagess, Jul. 22, 2005.

Mavrikios D et al, A prototype virtual reality-based demonstrator for immersive and interactive simulation of welding processes, International Journal of Computer Integrated manufacturing, Taylor and Francis, Basingstoke, GB, vol. 19, No. 3, 8 pages, Apr. 1, 2006, pp. 294-300.

Nancy C. Porter, Edison Welding Institute; J. Allan Cote, General Dynamics Electric Boat; Timothy D. Gifford, VRSim; and WIM LAM, FCS Controls; Virtual Reality Welder Trainer, Session 5: Joining Technologies for Naval Applications, 16 pages, earliest date Jul. 14, 2006.

T Borzecki, G. Bruce, Y.S. Han, M. Heinemann, A. Imakita, L. Josefson, W. Nie, D. Olson, F. Roland, and Y. Takeda, 16th International Shop and Offshore Structures Congress: Aug. 20-25, 2006: Southhampton, UK, 49 pages, vol. 2 Specialist Committee V.3 Fabrication Technology Committee Mandate.

Ratnam and Khalid: "Automatic classification of weld defects using simulated data and an MLP neutral network." Insight vol. 49, No. 3; 6 pages, Mar. 2007.

Wang et al., Study on welder training by means of haptic guidance and virtual reality for arc welding, 2006 IEEE International Conference on Robotics and Biomimetics, ROBIO 2006 ISBN-10: 1424405718, 5 pages, p. 954-958.

CS Wave, The Virtual Welding Trainer, 6 pages, 2007.

asciencetutor.com, A division of Advanced Science and Automation Corp., VWL (Virtual Welding Lab), 2 pages, 2007.

Eric Linholm, John Nickolls, Stuart Oberman, and John Montrym, "NVIDIA Testla: A Unifired Graphics and Computing Architecture", IEEE Computer Society, 17 pages, 2008.

NSRP ASE, Low-Cost Virtual Realtiy Welder Training System, 1 Page, 2008.

Edison Welding Institute, E-Weld Predictor, 3 pages, 2008.

CS Wave, A Virtual learning tool for welding motion, 10 pages, Mar. 14, 2008.

The Fabricator, Virtually Welding, Training in a virtual environment gives welding students a leg up, 4 pages, Mar. 2008.

N. A. Tech., P/NA.3 Process Modeling and Optimization, 11 pages, Jun. 4, 2008.

FH Joanneum, Fronius—virtual welding, 2 pages, May 12, 2008.

Eduwelding+, Training Activities with arc+ simulator; Weld Into the Future, Online Welding Simulator—A virtual training environment; 123arc.com; 6 pages, May 2008.

ChemWeb.com, Journal of Materials Engineering and Performance (v.7, #5), 3 pgs., printed Sep. 26, 2012.

Choquet, Claude; "ARC+: Today's Virtual Reality Solution for Welders" Internet Page, 6 pages, Jan. 1, 2008.

Juan Vicenete Rosell Gonzales, "RV-Sold: simulator virtual para la formacion de soldadores"; Deformacion Metalica, Es. vol. 34, No. 301, 14 pages, Jan. 1, 2008.

White et al., Virtual welder training, 2009 IEEE Virtual Reality Conference, 1 page, p. 303, 2009.

Training in a virtual environment gives welding students a leg up, retrieved on Apr. 12, 2010 from: http://www.thefabricator.com/article/arcwelding/virtually-welding, 4 pages.

Sim Welder, Train better welders faster, retrieved on Apr. 12, 2010 from: http://www.simwelder.com.

P. Beatriz Garcia-Allende, Jesus Mirapeix, Olga M. Conde, Adolfo Cobo and Jose M. Lopez-Higuera; Defect Detection in Arc-Welding Processes by Means of the Line-to-Continuum Method and Feature Selection; www.mdpi.com/joumal/sensors; 2009; 18 pages; Sensors 2009, 9, 7753-7770; doi; 10.3390/s91007753.

Production Monitoring 2 brochure, four (4) pages, The Lincoln Electric Company, May 2009.

International Search Report and Written Opinion from PCT/IB10/02913 dated Apr. 19, 2011.

Bjorn G. Agren; Sensor Integration for Robotic Arc Welding; 1995; vol. 5604C of Dissertations Abstracts International p. 1123; Dissertation Abs Online (Dialog® File 35): © 2012 ProQuest Info& Learning: http://dialogweb.com/cgi/dwclient?req=1331233317524; one (1) page; printed Mar. 8, 2012.

J. Hu and Hi Tsai, Heat and mass transfer in gas metal arc welding. Part 1: the arc, found in ScienceDirect, International Journal of Heat

(56) References Cited

OTHER PUBLICATIONS and Mass Transfer 50 (2007), 14 pages, 833-846, available online on Oct. 24, 2006 http://www.web.mst.edu/~tsai/publications/HU-IJHMT-2007-1-60.pdf.
M. Ian Graham, Texture Mapping, Carnegie Mellon University Class 15-462 Computer Graphics, Lecture 10, 53 pages, dated Feb. 13, 2003.
Summons to attend oral proceedings pursuant to Rule 115(1) EPC from EP Application No. 15732934.3 dated Jun. 26, 2019.
Andreas Grahn, "Interactive Simulation of Contrast Fluid using Smoothed Particle Hydrodynamics," Jan. 1, 2008, Masters Thesis in Computing Science, Umea University, Department of Computing Science, Umea Sweden; 69 pages.
Marcus Vesterlund, "Simulation and Rendering of a Viscous Fluid using Smoothed Particle Hydrodynamics," Dec. 3, 2004, Master's Thesis in Computing Science, Umea University, Department of Computing Science, Umea Sweden; 46 pages.
M. Muller,, et al., "Point Based Animation of Elastic, Plastic and Melting Objects," Eurographics/ACM SIGGRAPH Symposium on Computer Animation (2004); 11 pages.
Andrew Nealen, "Point-Based Animation of Elastic, Plastic, and Melting Objects," CG topics, Feb. 2005; 2 pages.
D. Tonnesen, Modeling Liquids and Solids using Thermal Particles, Proceedings of Graphics Interface'91, pp. 255-262, Calgary, Alberta, 1991.
CUDA Programming Guide Version 1.1, Nov. 29, 2007, 143 pages.
Websters II new college dictionary, 3rd ed., Houghton Mifflin Co., copyright 2005, Boston, MA, p. 1271, definition of Wake, 3 pages.
Da Dalto L, et al. "CS Wave: Learning welding motion in a virtual environment" Published in Proceedings of the IIW International Conference, Jul. 10-11, 2008; 19 pages.
CS Wave-Manual, "Virtual Welding Workbench User Manual 3.0" 2007; 25 pages.
Choquet, Claude. "ARC+®: Today's Virtual Reality Solution for Welders", Published in Proceedings of the IIW International Conference; Jul. 10-11, 2008; 19 pages.
Welding Handbook, Welding Science & Technology, American Welding Society, Ninth Ed., Copyright 2001. Appendix A Terms and Definitions 54 pages.
Virtual Welding: A Low Cost Virtual Reality Welder Training System, NSRP RA 07-01—BRP Oral Review Meeting in Charleston, SC at ATI, Mar. 2008; 6 pages.
Dorin Aiteanu, "Virtual and Augmented Reality Supervisor for a New Welding Helmet Dissertation," Nov. 15, 2005; 154 pages.
Screen Shot of CS Wave Exercise 135.FWPG Root Pass Level 1 https://web.archive.org/web/20081128081858/http:/wave.c-s.fr/images/english/snap_evolution2.Jpg; 1 page.
Screen Shot of CS Wave Control Centre V3.0.0 https://web.archive.org/web/20081128081915/http:/wave.c-s.fr/Images/english/snap_evolution4.jpg; 1 page.
Screen Shot of CS Wave Control Centre V3.0.0 https://web.archive.org/web/20081128081817/http:/wave.c-s.fr/mages/english/snap_evolution6.jpg; 1 page.
Da Dalto L, et al. "CS Wave a Virtual learning tool for the welding motion," Mar. 14, 2008; 10 pages.
Nordruch, Stefan, et al. "Visual Online Monitoring of PGMAW Without a Lighting Unit", Jan. 2005; 14 pages.
The Evolution of Computer Graphics; Tony Tamasi, NVIDIA, 2008; 36 pages.
VRSim Powering Virtual Reality, www.lincolnelectric.com/en-us/eguipment/Iraining-eguipment/Pages/powered-by-'rsim.aspx, 2016, 1 page.
Hillers, B.; Graser, A. "Direct welding arc observation without harsh flicker," 8 pages, allegedly FABTECH International and AWS welding show, 2007.
Declaration of Dr. Michael Zyda, May 3, 2016, exhibit to IPR 2016-00905; 72 pages.
Declaration of Edward Bohnart, Apr. 27, 2016, exhibit to IPR 2016-00905; 23 pages.
Declaration of Dr. Michael Zyda, May 3, 2016, exhibit to IPR 2016-00904; 76 pages.
Declaration of Edward Bohnart, Apr. 27, 2016, exhibit to IPR 2016-00904; 22 pages.
Declaration of Axel Graeser, Apr. 17, 2016, exhibit to IPR 2016-00840; 88 pages.
International Search Report and Written Opinion from PCT/IB2014/002346 dated Feb. 24, 2015.
ARC+—Archived Press Release from WayBack Machine from Jan. 31, 2008-Apr. 22, 2013, Page, https://web.3rchive.org/web/20121006041803/http://www.123certification.com/en/article_press/index.htm, Jan. 21, 2016, 3 pages.
P. Tschirner et al., "Virtual and Augmented Reality for Quality Improvement of Manual Welds" National Institute of Standards and Technology, Jan. 2002, Publication 973, 24 pages.
Y. Wang et al., "Impingement of Filler Droplets and Weld Pool During Gas Metal Arc Welding Process" International Journal of Heat and Mass Transfer, Sep. 1999, 14 pages.
Larry Jeffus, "Welding Principles and Applications," Sixth Edition, 2008, 10 pages.
R.J. Renwick et al., "Experimental Investigation of GTA Weld Pool Oscillations," Welding Research—Supplement to the Welding Journal, Feb. 1983, 7 pages.
Matt Phar, "GPU Gems 2 Programming Techniques for High-Performance Graphics and General-Purpose Computation," 2005, 12 pages.
International Search Report and Written Opinion from PCT/IB2015/000161 dated Jun. 8, 2015.
International Search Report and Written Opinion from PCT/IB2015/000257 dated Jul. 3, 2015.
International Search Report and Written Opinion from PCT/IB2015/000777 dated Sep. 21, 2015.
International Search Report and Written Opinion from PCT/IB2015/000814 dated Nov. 5, 2015.
International Search Report and Written Opinion from PCT/IB2015/001711 dated Jan. 4, 2016.
International Preliminary Report on Patentability from PCT/IB2014/001796 dated Mar. 15, 2016.
International Preliminary Report on Patentability from PCT/IB2015/000161 dated Aug. 25, 2016.
International Preliminary Report on Patentability from PCT/IB2015/000257 dated Sep. 15, 2016.
International Search Report and Written Opinion from PCT/IB2015/000777 dated Dec. 15, 2016.
International Search Report and Written Opinion from PCT/IB2015/000814 dated Dec. 15, 2016.
International Preliminary Report on Patentability from PCT/IB2015/001084 dated Jan. 26, 2017.
Extended European Search Report from EP Application No. 10860823.3 dated Jun. 6, 2017.
Communication Pursuant to Article 94(3) EPC in EP Application No. 13753204.0 dated Mar. 9, 2017.
Office action from U.S. Appl. No. 12/499,687 dated Oct. 16, 2012.
Office action from U.S. Appl. No. 12/499,687 dated Jun. 26, 2013.
Notice of Allowance from U.S. Appl. No. 12/966,570 dated Apr. 29, 2014.
Corrected Notice of Allowance from U.S. Appl. No. 12/966,570 dated Feb. 23, 2015.
Russell and Norvig, "Artificial Intelligence: A Modern Approach", Prentice-Hall (Copyright 1995).
Mechanisms and Mechanical Devices Source Book, Chironis, Neil Sclater, McGraw Hill; 2nd Addition, 1996.
International Search Report and Written Opinion from PCT/US12/45776 dated Oct. 1, 2012.
Bender Shipbuilding and Repair Co. Virtual Welding—A Low Cost Virtual Reality Welding Training System. Proposal submitted pursuant to MSRP Advanced Shipbuilding Enterprise Research Announcement, Jan. 23, 2008. 28 pages, See also, http://www.nsrp.org/6-PresentationsM/D/020409 Virtual Welding Wilbur.pdf.
Aiteanu, Dorian; and Graser, Axel. "Generation and Rendering of a Virtual Welding Seam in an Augmented Reality Training Environment." Proceedings of the Sixth IASTED International Conference

(56) References Cited

OTHER PUBLICATIONS on Visualization, Imaging and Image Processing, Aug. 28-30, 2006, 8 pages, allegedly Palma de Mallorca, Spain. Ed. J.J. Villaneuva. ACTA Press.
Tschirner, Petra; Hillers, Bernd; and Graser, Axel "A Concept for the Application of Augmented Reality in Manual Gas Metal Arc Welding." Proceedings of the International Symposium on Mixed and Augmented Reality; 2 pages; 2002.
Penrod, Matt. "New Welder Training Tools." EWI PowerPoint presentation; 16 pages; allegedly 2008.
Fite-Georgel, Pierre. "Is there a Reality in Industrial Augmented Reality?" 10th IEEE International Symposium on Mixed and Augmented Reality (ISMAR). 10 pages, allegedly 2011.
Hillers, B.; Graser, A. "Real time Arc-Welding Video Observation System." 62nd International Conference of IIW, Jul. 12-17, 2009, 5 pages, allegedly Singapore 2009.
Advance Program of American Welding Society Programs and Events. Nov. 11-14, 2007. 31 pages. Chicago.
TEREBES: examples from http://www.terebes.uni-bremen.de.; 6 pages.
Sandor, Christian; Gudrun Klinker. "PAARTI: Development of an Intelligent Welding Gun for BMW." PIA2003, 7 pages, Tokyo. 2003.
ARVIKA Forum Vorstellung Projekt PAARI. BMW Group Virtual Reality Center. 4 pages. Nuermberg. 2003.
Sandor, Christian; Klinker, Gudrun. "Lessons Learned in Designing Ubiquitous Augmented Reality User Interfaces." 21 gages, allegedly from Emerging Technologies of Augmented Reality: Interfaces Eds. Haller, M.; Billinghurst, M.; Thomas, B. Idea Group Inc. 2006.
Impact Welding: examples from current and archived website, trade shows, etc. See, e.g., http://www.impactwelding.com. 53 pages.
http://www.nsrp.org/6-Presentations/WDVirtual_Welder.pdf (Virtual Reality Welder Training, Project No. SI051, Navy ManTech Program, Project Review for ShipTech 2005); 22 pages. Biloxi, MS.
https://app.aws_org/w/r/www/wj/2005/031WJ_2005_03.pdf (AWS Welding Journal, Mar. 2005 (see, e.g., p. 54))., 114 pages.
https://app.aws.org/conferences/defense/live index.html (AWS Welding in the Defense Industry conference schedule, 2004); 12 pages.
https://app.aws.org/wj/2004/04/052/njc (AWS Virtual Reality Program to Train Welders for Shipbuilding, workshop information, 2004); 7 pages.
https://app.aws.org/wj/2007/11WJ200711.pdf (AWS Welding Journal, Nov. 2007); 240 pages.
American Welding Society, "Vision for Welding Industry;" 41 pages.
Energetics, Inc. "Welding Technology Roadmap," Sep. 2000, 38 pages.
Aiteanu, Dorian; and Graser, Axel. Computer-Aided Manual Welding Using an Augmented Reality Supervisor Sheet Metal Welding Conference XII, Livonia, MI, May 9-12, 2006, 14 pages.
Hillers, Bernd; Aiteanu, Dorin and Graser, Axel "Augmented Reality—Helmet for the Manual Welding Process," Institute of Automation, University of Bremen, Germany; 21 pages.
Aiteanu, Dorin, Hillers, Bernd and Graser, Axel "A Step Forward in Manual Welding: Demonstration of Augmented Reality Helmet" Institute of Automation, University of Bremen, Germany, Proceedings of the Second IEEE and ACM International Symposium on Mixed and Augmented Reality; 2003; 2 pages.
ArcSentry Weld Quality Monitoring System; Native American Technologies, allegedly 2002, 5 pages.
P/NA.3 Process Modelling and Optimization; Native American Technologies, allegedly 2002, 5 pages.
B. Hillers, D. Aitenau, P. Tschimer, M. Park, A. Graser, B. Balazs, L. Schmidt, "TEREBES: Welding Helmet with AR Capabilities", Institute of Automatic University Bremen; Institute of Industrial Engineering and Ergonomics, 10 pages, allegedly 2004.
Sheet Metal Welding Conference Xlr, American Welding Society Detroit Section, May 2006, 11 pages.
Kenneth Fast, Timothy Gifford, Robert Yancey, "Virtual Training for Welding", Proceedings of the Third IEEE and ACM International Symposium on Mixed and Augmented Reality (ISMAR 2004); 2 pages.
Amended Answer to Complaint with Exhibit A for Patent Infringement filed by Seabery North America Inc. in *Lincoln Electric Co. et al.* v. *Seabery Soluciones, S.L. et al.*, Case No. 1:15-cv-01575-DCN, docket No. 44, filed Mar. 1, 2016, in the U.S. District Court for the Northern District of Ohio; 19 pages.
Amended Answer to Complaint with Exhibit A for Patent Infringement filed by Seabery Soluciones SL in *Lincoln Electric Co. et al.* v. *Seabery Soluciones, S.L_ et al.*, Case No. 1:15-cv-01575-DCN, docket No. 45, filed Mar. 1, 2016 in the U.S. District Court for the Northern District of Ohio; 19 pages.
Reply to Amended Answer to Complaint for Patent Infringement filed by Lincoln Electric Company; Lincoln Global, Inc. in *Lincoln Electric Co. et al.* v. *Seabery Soluciones, S.L. et al.*, Case No. 1:15-cv-01575-DCN; docket No. 46, filed Mar. 22, 2016; 5 pages.
Answer for Patent Infringement filed by Lincoln Electric Company, Lincoln Global, Inc. in *Lincoln Electric Co. et al.* v. *Seabery Soluciones, S.L. et al.*, Case No. 1:15-cv-01575-DCN; docket No. 47, filed Mar. 22, 2016; 5 pages.
Petition for Inter Partes Review of U.S. Pat. No. 8,747,116; IPR 2016-00749; Apr. 7, 2016; 70 pages.
Petition for Inter Partes Review of U.S. Pat. No. RE45,398; IPR 2016-00840; Apr. 18, 2016; 71 pages.
Petition for Inter Partes Review of U.S. Pat. No. 9,293,056; IPR 2016-00904; May 9, 2016; 91 pages.
Petition for Inter Partes Review of U.S. Pat. No. 9,293,057; IPR 2016-00905; May 9, 2016; 87 pages.
http://www.vrsim.net/history, downloaded Feb. 26, 2016.
Complaint for Patent Infringement in *Lincoln Electric Co. et al.* v. *Seabery Soluciones, S.L. et al.*, Case No. 1:15-av-01575-DCN, docket No. 1, filed Aug. 10, 2015, in the U.S. District Court for the Northern District of Ohio; 81 pages.
Kobayashi, Ishigame, and Kato, "Simulator of Manual Metal Arc Welding with Haptic Display" ("Kobayashi 2001"), Proc. of the 11th International Conf. on Artificial Reality and Telexistence (ICAT), Dec. 5-7, 2001, pp. 175-178, Tokyo, Japan.
Wahi, Maxwell, and Reaugh, "Finite-Difference Simulation of a Multi-Pass Pipe Weld" ("Wahi"), vol. L, paper 3/1, International Conference on Structural Mechanics in Reactor Technology, San Francisco, CA, Aug. 15-19, 1977.
Declaration of Dr. Michael Zyda, May 3, 2016, exhibit to IPR 2016-00749.
Declaration of Edward Bohnert, Apr. 27, 2016, exhibit to IPR 2016-00749.
Swantec corporate web page downloaded Apr. 19, 2016. httpl/www.swantec.com/technology/numerical-simulation/.
Catalina, Stefanescu, Sen, and Kaukler, Interaction of Porosity with a Planar Solid/Liquid Interface(Catalina),), Metallurgical and Materials Transactions, vol. 35A, May 2004, pp. 1525-1538.
Fletcher Yoder Opinion re RE45398 and U.S Appl. No. 14/589,317; including appendices; Sep. 9, 2015; 1700 pages.
Kobayashi, Ishigame, and Kato, "Skill Training System of Manual Arc Welding by Means of Face-Shield-Like HMD and Virtual Electrode" ("Kobayashi 2003"), Entertainment Computing, vol. 112 of the International Federation for Information Processing (IFIP), Springer Science + Business Media, New York, copyright 2003, pp. 389-396.
G.E. Moore, No exponential is forever: but Forever can be delayed!: IEEE International Solid-State Circuits Conference, 2003. 19 pages.
"High Performance Computer Architectures_ A Historical Perspective," downloaded May 5, 2016. http://homepages.inf.ed.ac.uk/cgi/mi/comparch. pl?Paru/perf.html,Paru/perf-f.html,Paru/menu-76.html; 3 pages.
Chuansong Wu: "Microcomputer-based welder training simulator", Computers in Industry, vol. 20, No. 3, Oct. 1992, 5 pages, pp. 321-325, XP000205597, Elsevier Science Publishers, Amsterdam, NL.
ViziTech USA, retrieved on Mar. 27, 2014 from http://vizitechusa.com/, 2 pages.

(56) References Cited

OTHER PUBLICATIONS

Guu and Rokhlin ,Technique for Simultaneous Real-Time Measurements of Weld Pool Surface Geometry and Arc Force, 10 pages, Dec. 1992.
William T. Reeves, "Particles Systems—A Technique for Modeling a Class of Fuzzy Objects", Computer Graphics 17:3 pp. 359-376, 1983, 17 pages.
S.B. Chen, L. Wu, Q. L. Wang and Y. C. Liu, Self-Learning Fuzzy Neural Networks and Computer Vision for Control of Pulsed GTAW, 9 pages, dated May 1997.
Patrick Rodjito, Position tracking and motion prediction using Fuzzy Logic, 81 pages, 2006, Colby College.
D'Huart, Deat, and Lium; Virtual Environment for Training, 6th International Conference, ITS 20002, 6 pages, Jun. 2002.
Konstantinos Nasios (Bsc), Improving Chemical Plant Safety Training Using Virtual Reality, Thesis submitted to the University of Nottingham for the Degree of Doctor of Philosophy, 313 pages, Dec. 2001.
ANSI/A WS D 10.11 MID 10. 11 :2007 Guide for Root Pass Welding of Pipe without Backing Edition: 3rd American Welding Society / Oct. 13, 2006/36 pages ISBN: 0871716445, 6 pages.
M. Jonsson, L. Karlsson, and L-E Lindgren, Simulation of Tack Welding Procedures in Butt Joint Welding of Plates Welding Research Supplement, Oct. 1985, 7 pages.
Isaac Brana Veiga, Simulation of a Work Cell in the IGRIP Program, dated 2006, 50 pages.
Balijepalli, A. and Kesavadas, Haptic Interfaces for Virtual Environment and Teleoperator Systems, Haptics 2003, Department of Mechanical & Aerospace Engineering, State University of New York at Buffalo, NY.
Johannes Hirche, Alexander Ehlert, Stefan Guthe, Michael Doggett, Hardware Accelerated Per-Pixel Displacement Mapping, 8 pages.
Yao et al., 'Development of a Robot System for Pipe Welding'. 2010 International Conference on Measuring Technology and Mechatronics Automation. Retrieved from the Internet: http://ieeexplore.ieee.org/stamp/stamp.jsp?tp=&arnumber=5460347&tag=1; pp. 1109-1112, 4 pages.
Steve Mann, Raymond Chun Bing Lo, Kalin Ovtcharov, Shixiang Gu, David Dai, Calvin Ngan, Tao Al, Realtime HDR (High Dynamic Range) Video for Eyetap Wearable Computers, FPGA-Based Seeing Aids, and Glasseyes (Eyetaps), 2012 25th IEEE Canadian Conference on Electrical and Computer Engineering (CCECE), pp. 1-6, 6 pages, Apr. 29, 2012.
KYT Dotson, Augmented Reality Welding Helmet Prototypes How Awsome the Technology Can Get, Sep. 26, 2012, Retrieved from the Internet: URL:http://siliconangle.com/blog/2012/09/26/augmented-reality-welding-helmet-prototypes-how-awesome-the-technology-can-get/,1 page, retrieved on Sep. 26, 2014.
Terrence O'Brien, "Google's Project Glass gets some more details",Jun. 27, 2012 (Jun. 27, 2012), Retrieved from the Internet: http://www.engadget.com/2012/06/27/googles-project-glass-gets-some-more-details/, 1 page, retrieved on Sep. 26, 2014.
T. Borzecki, G. Bruce, YS. Han, et al., Specialist Committee V.3 Fabrication Technology Committee Mandate, Aug. 20-25, 2006, 49 pages, vol. 2, 16th International Ship and Offshore Structures Congress, Southampton, UK.
G. Wang, P.G. Huang, and Y.M. Zhang: "Numerical Analysis of Metal Transfer in Gas Metal Arc Welding": Departments of Mechanical Engineering; and Electrical and Computer Engineering, University of Kentucky, Lexington, KY 40506-0108, 10 pages, Dec. 10, 2001.
Echtler et al, "17 The Intelligent Welding Gun: Augmented Reality for Experimental Vehicle Construction," Virtual and Augmented Reality Applications in Manufacturing (2003) pp. 1-27.
Teeravarunyou et al, "Computer Based Welding Training System," International Journal of Industrial Engineering (2009) 16(2): 116-125.
Antonelli et al, "A Semi-Automated Welding Station Exploiting Human-Robot Interaction," Advanced Manufacturing Systems and Technology (2011) pp. 249-260.
Praxair Technology Inc, "The RealWeld Trainer System: Real Weld Training Under Real Conditions" Brochure (2013) 2 pages.
Xie et al., "A Real-Time Welding Training System Base on Virtual Reality," Wuhan Onew Technology Co., Lid, IEEE Virtual Reality Conference 2015, Mar. 23-27, Arles France, pp. 309-310.
Lincoln Global, Inc., "VRTEX 360: Virtual Reality Arc Welding Trainer" Brochure (2015) 4 pages.
Wuhan Onew Technology Co Ltd, "ONEW-360 Welding Training Simulator" http://en.onewtech.com/_d276479751.htm as accessed on Jul. 10, 2015, 14 pages.
The Lincoln Electric Company, "VRTEX Virtual Reality Arc Welding Trainer," http://www.lincolnelectric.com/en-us/equipment/training-equipment/Pages/vrtex.aspx as accessed on Jul. 10, 2015, 3 pages.
Miller Electric Mfg Co, "LiveArc: Welding Performance Management System" Owner's Manual, (Jul. 2014) 64 pages.
Miller Electric Mfg Co, "LiveArc Welding Performance Management System" Brochure, (Dec. 2014) 4 pages.
Office action from U.S. Appl. No. 12/499,687 dated Mar. 6, 2014.
Office action from U.S. Appl. No. 12/499,687 dated Nov. 6, 2014.
Office action from U.S. Appl. No. 12/966,570 dated May 8, 2013.
Office action from U.S. Appl. No. 13/543,240 dated Nov. 14, 2014.
Office action from U.S. Appl. No. 14/444,173 dated Mar. 18, 2015.
Notice of Allowance from U.S. Appl. No. 13/543,240 dated Jun. 3, 2015.
Notice of Allowance from U.S. Appl. No. 14/444,173 dated Jun. 24, 2015.
Office action from U.S. Appl. No. 15/077,481 dated May 23, 2016.
Notice of Allowance from U.S. Appl. No. 15/077,481 dated Aug. 10, 2016.
Notice of Allowance from U.S. Appl. No. 15/077,481 dated Feb. 3, 2017.
Office Action from U.S. Appl. No. 14/190,812 dated Nov. 9, 2016.
Office Action from U.S. Appl. No. 14/190,812 dated Feb. 23, 2017.
Office Action from U.S. Appl. No. 15/077,532 dated Dec. 29, 2017.
Office Action from U.S. Appl. No. 14/293,700 dated Dec. 28, 2016.
Notice of Allowance from U.S. Appl. No. 14/293,700 dated May 10, 2017.
Office Action from U.S. Appl. No. 14/293,826 dated Dec. 30, 2016.
Office Action from U.S. Appl. No. 14/293,826 dated Jul. 21, 2017.
Office Action from U.S. Appl. No. 14/526,914 dated Feb. 3, 2017.
Office Action from U.S. Appl. No. 14/526,914 dated Jun. 6, 2017.
Office Action from U.S. Appl. No. 14/552,739 dated Feb. 17, 2017.
Office Action from U.S. Appl. No. 14/615,637 dated Apr. 27, 2017.
Office Action from JP Application No. 2016-569029 dated Jun. 11, 2019.
Office Action from U.S. Appl. No. 14/827,657 dated May 26, 2017.
Office Action from U.S. Appl. No. 14/827,657 dated Jan. 16, 2018.
Office Action from U.S. Appl. No. 15/228,524 dated Feb. 5, 2018.
Office Action from Chinese Application No. 201280075678.5 dated Jul. 5, 2016.
Office Action from Chinese Application No. 201480027306.4 dated Aug. 3, 2016.
Office Action from Chinese Application No. 201380017661.9 dated Aug. 22, 2016.
Office Action from Chinese Application No. 201480025359.2 dated Sep. 26, 2016.
Office Action from Chinese Application No. 201480025614.3 dated Nov. 28, 2016.
Office Action from Chinese Application No. 201480025359.2 dated Feb. 28, 2017.
Office Action from Chinese Application No. 201380076368.X dated Mar. 1, 2017.
Office Action from Chinese Application No. 201480025614.3 dated Jun. 9, 2017.
Office Action in CN Application No. 201480012861.X dated Jul. 18, 2017.
Office Action in CN Application No. 201610179195.X dated Jul. 19, 2017.
Office Action in CN Application No. 201480025985.1 dated Aug. 10, 2017.
Decision on Rejection in CN Application No. 201380047141.2 dated Sep. 7, 2017.
Office Action from U.S. Appl. No. 14/829,161 dated Jul. 28, 2017.

(56) References Cited

OTHER PUBLICATIONS

Notification of Reason for Refusal from KR Application No. 10-2015-7002697 dated Sep. 25, 2017.
Communication Pursuant to Article 94(3) EPC in EP Application No. 14732357.0 dated Feb. 12, 2018.
Office Action in JP Application No. 2015-562352 dated Feb. 6, 2018.
Office Action in JP Application No. 2015-562353 dated Feb. 6, 2018.
Office Action in JP Application No. 2015-562354 dated Feb. 6, 2018.
Office Action in JP Application No. 2015-562355 dated Feb. 6, 2018.
Office Action in CN Application No. 201710087175.4 dated Feb. 1, 2018.
Bargteil et al., "A Texture Synthesis Method for Liquid Animations," Eurographics/ ACM SIGGRAPH Symposium on Computer Animation, 2006, pp. 345-351.
Aidun, Daryush K "Influence of simulated high-g on the weld size of Al—Li-Alloy" Acta Astronautica, vol. 48, No. 2-3, pp. 153-156, 2001.
Boss (engineering), Wikipedia, 1 page, printed Feb. 6, 2014.
CS Wave, Product Description, 2 pages, printed Jan. 14, 2015.
EnergynTech Inc.; website printout; http://www.energyntech.com./; Advanced Metals Processing Technology & Flexible Automation for Manufacturing; Virtual Welder; Virtual training system for beginning welders; 2 page; 2014.
EnergynTech Inc.; website printout; http://www.energyntech.com/Zipper.html; Zipper Robot Performing a HiDep Weld; 1 page 2014.
Erden, "Skill Assistance with Robot for Manual Welding", Marie Curie Intra-European Fellowship, Project No. 297857, 3 pgs., printed Apr. 27, 2015.
EWM Virtual Welding Trainer, 2 pages, printed Jan. 14, 2015.
Fillet weld, Wikipedia, 3 pgs, printed Feb. 6, 2014.
Fronius, Virtual Welding, 8 pages, printed Jan. 14, 2015.
Fronius, Virtual Welding, The Welder Training of the Future, 8 page brochure, 2011.
The Goodheart-Wilcox Co., Inc., Weld Joints and Weld Types, Chaper 6; pp. 57-68; date unknown.
Kemppi ProTrainer, product data, 3 pages, printed Jan. 14, 2015.
Leap Motion, Inc., product information, copyright 2013, 14 pages.
Learning Labs, Inc., Seabery, Soldamatic Augmented Reality Welding Trainers, 4 pgs., printed Mar. 20, 2014.
Lim et al., "Automatic classification of weld defects using simulated data and MLP neural network", Insight, vol. 49, No. 3, Mar. 2007.
Narayan et al., "Computer Aided Design and Manufacturing," pp. 3-4, 14-15, 17-18, 92-95, and 99-100, Dec. 31, 2008.
NISRP—Virtual Welding—A Low Cost Virtual Reality Welder Training System—Phase II—Final Report; Feb. 29, 2012; Kenneth Fast, Jerry Jones, Valerie Rhoades; 53 pages.
Seabury Soluciones, SOLDAMATIC Welding Trainer Simulator, 30 pages, printed Jan. 14, 2015.
Terebes; Institute of Automation; University of Bremen; Project Motivation Problems Using Traditional Welding Masks; 2 page ; 2015.
Weld nut, Wikipedia, 2 pgs, printed Feb. 6, 2014.
Weldplus, Welding Simulator, 2 pages, printed Jan. 14, 2015.
WeldWatch Software/Visible Welding; website printout; http://visiblewelding.com/weldwatch-software/; 4 pages; 2015.
Exhibit B from Declaration of Morgan Lincoln in *Lincoln Electric Co. et al. v. Seabery Soluciones, S.L. et al.*, Case No. 1:15-cv-01575-DCN, dated Dec. 20, 2016, 5 pages.
Adams et., "Adaptively Sampled Particle Fluids," ACM Transactions on Graphics, vol. 26, No. 3, Article 48, Jul. 2007, pp. 48.1-48.7.
Notice of Allowance from U.S. Appl. No. 15/077,532 dated Mar. 28, 2018.
Bargteil et al., "A Semi-Lagrangian Contouring Method for Fluid Simulation," ACM Transactions on Graphics, vol. 25, No. 1, Jan. 2006, pp. 19-38.
Chentanez et al., "Liquid Simulation on Lattice-Based Tetrahedral Meshes," Eurographics/ACM SIGGRAPH Symposium on Computer Animation (2007), 10 pages.
Chentanez et al., "Simultaneous Coupling of Fluids and Deformable Bodies," Eurographics/ ACM SIGGRAPH Symposium on Computer Animation, 2006, pp. 83-89.
Clausen et al., "Simulating Liquids and Solid-Liquid Interactions with Lagrangian Meshes," ACM Transactions on Graphics, vol. 32, No. 2, Article 17, Apr. 2013, pp. 17.1-17.15.
Feldman et al., "Animating Suspended Particle Explosions," Computer Graphics Proceedings, Annual Conference Series, Jul. 27-31, 2003, pp. 1-8.
Feldman et al., "Fluids in Deforming Meshes," Eurographics/ACM SIGGRAPH Symposium on Computer Animation (2005), pp. 255-259.
Foster et al., "Practical Animation of Liquids," ACM SIGGRAPH, Aug. 12-17, 2001, Los Angeles, CA, pp. 23-30.
Foster et al., "Realistic Animation of Liquids," Graphical Models and Image Processing, vol. 58, No. 5, Sep. 1996, pp. 471-483.
Goktekin et al., "A Method for Animating Viscoelastic Fluids," Computer Graphics Proceedings, Annual Conference Series, Aug. 8-12, 2004, pp. 1-6.
Holmberg et al., "Efficient Modeling and Rendering of Turbulent Water over Natural Terrain," Proceedings of the 2nd International conference on Computer graphics and interactive techniques in Australasia and South East Asia, Singapore, Jun. 15-18, 2004, pp. 15-22.
Irving et al., "Efficient Simulation of Large Bodies of Water by Coupling Two and ThreeDimensional Techniques," ACM Transactions on Graphics (TOG), vol. 25, Issue 3, Jul. 2006,pp. 805-811.
Kass et al., "Rapid, Stable Fluid Dynamics for Computer Graphics," Computer Graphics, vol. 24, No. 4, Aug. 1990, pp. 49-57.
Klinger et al., "Fluid Animation with Dynamic Meshes," Computer Graphics Proceedings, Annual Conference Series, Jul. 30-Aug. 3, 2006, 820-825.
Muller et al., "Particle-Based Fluid Simulation for Interactive Applications," Eurographics/SIGGRAPH Symposium on Computer Animation (2003), pp. 154-159 and 372.
O'Brien et al., "Dynamic Simulation of Splashing Fluids," Proceedings of Computer Animation '95, Apr. 19-21, 1995, in Geneva, Switzerland, pp. 198-205.
Premoze et al., "Particle-Based Simulation of Fluids," Eurographics, vol. 22, No. 3 (2003), 10 pages.
Rasmussen et al., "Directable Photorealistic Liquids," Eurographics/ACM SIGGRAPH Symposium on Computer Animation (2004), pp. 193-202.
Stam, "Stable Fluids," SIGGRAPH 99 Conference Proceedings, Annual Conference Series, Aug. 1999, 121-128.
Thurey et al., "Real-time Breaking Waves for Shallow Water Simulations," Proceedings of the Pacific Conference on Computer Graphics and Applications, Maui, Hawaii, Oct. 29-Nov. 2, 2007, 8 pages.
Yaoming, "Applications of Microcomputer in Robot Technology," Scientific and Technical Documentation Press, Sep. 1987, pp. 360-365.
Communication pursuant to Article 94(3) EPC from EP Application No. 15732934.3 dated Apr. 24, 2018.
Communication pursuant to Article 94(3) EPC from EP Application No. 15731664.7 dated Jul. 13, 2018.
Office Action from KR Application No. 10-2015-7003281 dated Aug. 13, 2018.
Office Action from CN Application No. 201580021822.0 dated Aug. 30, 2018.
Communication pursuant to Article 94(3) EPC from EP Application No. 10860823.3 dated Aug. 30, 2018.
Office Action from KR Application No. 10-2015-7003281 dated Feb. 22, 2019.
Notification of Reasons for Refusal from JP Application No. 2016-569042 dated Feb. 26, 2019.
First Office Action from CN Application No. 201710868734.5 dated Mar. 22, 2019.
Office Action from U.S. Appl. No. 16/021,576 dated Nov. 1, 2018.

(56) References Cited

OTHER PUBLICATIONS

Notice of Allowance from U.S. Appl. No. 16/021,576 dated Feb. 20, 2019.
Second Office Action from CN Application No. 201710868734.5 dated May 22, 2019.

SYSTEM FOR CHARACTERIZING MANUAL WELDING OPERATIONS

CROSS-REFERENCE TO RELATED APPLICATIONS

The present application is being filed as a continuation application of U.S. patent application Ser. No. 16/021,576 filed on Jun. 28, 2018, which is a divisional application of U.S. patent application Ser. No. 15/077,532 filed on Mar. 22, 2016, now U.S. Pat. No. 10,068,495 issued on Sep. 4, 2018, which is a continuation of both U.S. patent application Ser. No. 14/293,700 filed on Jun. 2, 2014, now U.S. Pat. No. 9,773,429 issued on Sep. 26, 2017, and U.S. patent application Ser. No. 14/293,826 filed on Jun. 2, 2014, now abandoned, each of which is a continuation-in-part of U.S. patent application Ser. No. 13/543,240 filed on Jul. 6, 2012, now U.S. Pat. No. 9,221,117 issued on Dec. 29, 2015, which is a continuation-in-part of both U.S. patent application Ser. No. 12/966,570 filed on Dec. 13, 2010, now U.S. Pat. No. 9,230,449 issued on Jan. 5, 2016 (which itself is a continuation-in-part of U.S. patent application Ser. No. 12/499,687 filed on Jul. 8, 2009, now abandoned) and U.S. patent application Ser. No. 12/499,687 filed on Jul. 8, 2009, now abandoned, the entire disclosures of which are incorporated herein by reference.

BACKGROUND OF THE INVENTION

The described invention relates in general to a system for characterizing manual welding operations, and more specifically to a system for providing useful information to a welding trainee by capturing, processing, and presenting in a viewable format, data generated by the welding trainee in manually executing an actual weld in real time.

The manufacturing industry's desire for efficient and economical welder training has been a well documented topic over the past decade as the realization of a severe shortage of skilled welders is becoming alarmingly evident in today's factories, shipyards, and construction sites. A rapidly retiring workforce combined with the slow pace of traditional instructor-based welder training has been the impetus for the development of more effective training technologies. Innovations which allow for the accelerated training of the manual dexterity skills specific to welding, along with the expeditious indoctrination of arc welding fundamentals are becoming a necessity. The characterization and training system disclosed herein addresses this vital need for improved welder training and enables the monitoring of manual welding processes to ensure the processes are within permissible limits necessary to meet industry-wide quality requirements. To date, the majority of welding processes are performed manually, yet the field is lacking practical commercially available tools to track the performance of these manual processes. Thus, there is an ongoing need for an effective system for training welders to properly execute various types of welds under various conditions.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a system for characterizing manual and/or semiautomatic welding operations and exercises is provided. This system includes a data generating component; a data capturing component; and a data processing component. The data generating component further includes a fixture, wherein the geometric characteristics of the fixture are predetermined; a workpiece adapted to be mounted on the fixture, wherein the workpiece includes at least one joint to be welded, and wherein the vector extending along the joint to be welded defines an operation path; at least one calibration device, wherein each calibration device further includes at least two point markers integral therewith, and wherein the geometric relationship between the point markers and the operation path is predetermined; and a welding tool, wherein the welding tool is operative to form a weld at the joint to be welded, wherein the welding tool defines a tool point and a tool vector, and wherein the welding tool further includes a target attached to the welding tool, wherein the target further includes a plurality of point markers mounted thereon in a predetermined pattern, and wherein the predetermined pattern of point markers is operative to define a rigid body. The data capturing component further includes an imaging system for capturing images of the point markers. The data processing component is operative to receive information from the data capturing component and then calculate the position and orientation of the operation path relative to the three-dimensional space viewable by the imaging system; the position of the tool point and orientation of the tool vector relative to the rigid body; and the position of the tool point and orientation of the tool vector relative to the operation path.

In accordance with another aspect of the present invention, a system for characterizing manual and/or semiautomatic welding operations and exercises is also provided. This system includes a data generating component; a data capturing component; and a data processing component. The data generating component further includes a fixture, wherein the geometric characteristics of the fixture are predetermined; a workpiece adapted to be mounted on the fixture, wherein the workpiece includes at least one joint to be welded, and wherein the vector extending along the joint to be welded defines an operation path; at least one calibration device, wherein each calibration device further includes at least two point markers integral therewith, and wherein the geometric relationship between the point markers and the operation path is predetermined; and a welding tool, wherein the welding tool is operative to form a weld at the joint to be welded, wherein the welding tool defines a tool point and a tool vector, and wherein the welding tool further includes a target attached to the welding tool, wherein the target further includes a plurality of point markers mounted thereon in a predetermined pattern, and wherein the predetermined pattern of point markers is operative to define a rigid body. The data capturing component further includes an imaging system for capturing images of the point markers and the imaging system further includes a plurality of digital cameras. At least one band-pass filter is incorporated into the optical sequence for each of the plurality of digital cameras for permitting light from only the wavelengths which are reflected or emitted from the point markers for improving image signal-to-noise ratio. The data processing component is operative to receive information from the data capturing component and then calculate the position and orientation of the operation path relative to the three-dimensional space viewable by the imaging system; the position of the tool point and orientation of the tool vector relative to the rigid body; and the position of the tool point and orientation of the tool vector relative to the operation path.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
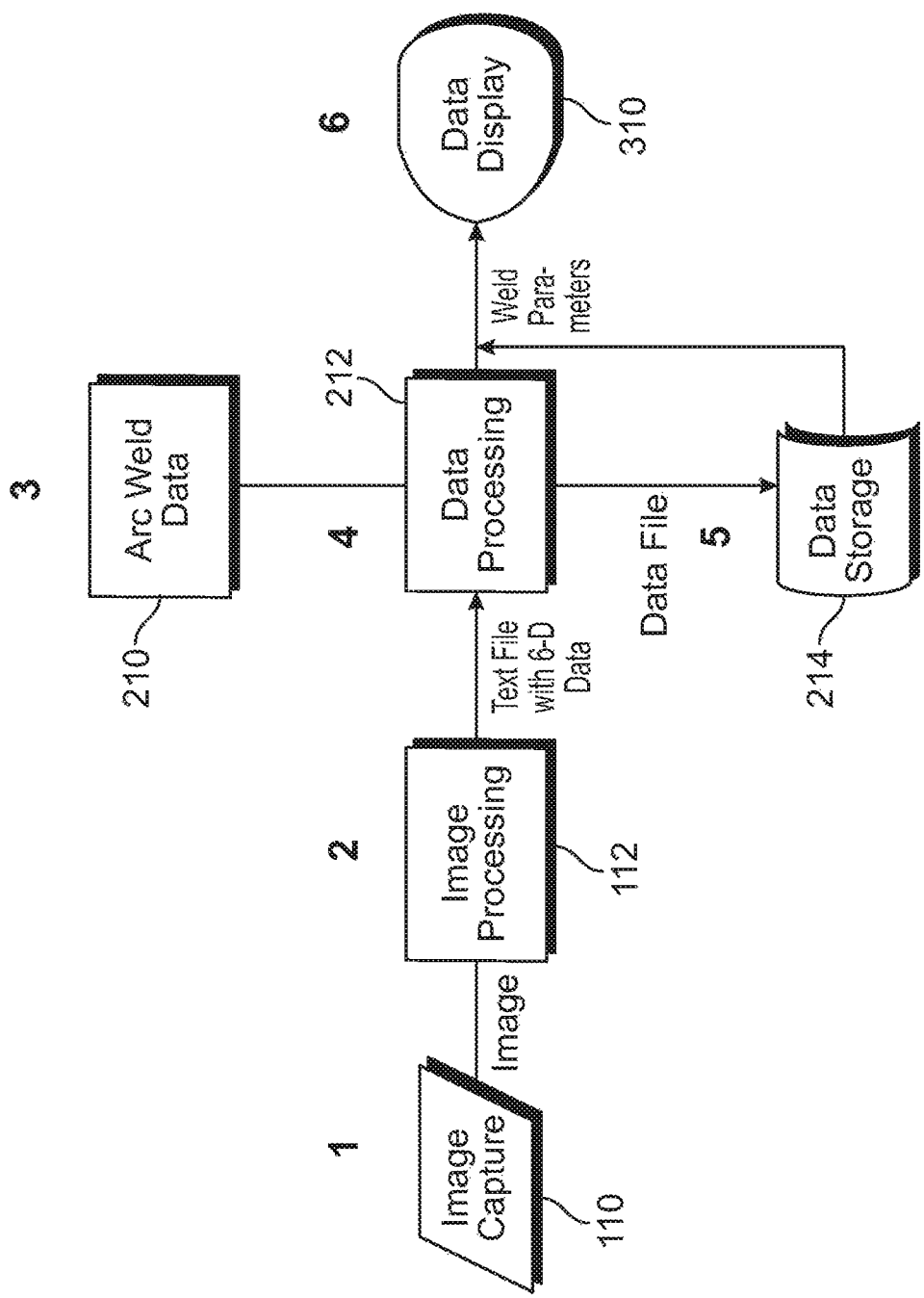
FIG. 1 is a flow chart illustrating the flow of information through the data processing and visualization component of an exemplary embodiment of the present invention.

Exemplary embodiments of the present invention are now described with reference to the Figures. Reference numerals are used throughout the detailed description to refer to the various elements and structures. In other instances, well-known structures and devices are shown in block diagram form for purposes of simplifying the description. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates to an advanced system for observing and characterizing manual welding exercises and operations. This system is particularly useful for welding instruction and welder training that provides an affordable tool for measuring manual welding technique and comparing that technique with established procedures. The training applications of this invention include: (i) screening applicant skill levels; (ii) assessing trainee progress over time; (iii) providing real-time coaching to reduce training time and costs; and (iv) periodically re-testing welder skill levels with quantifiable results. Processing monitoring and quality control applications include: (i) identification of deviations from preferred conditions in real time; (ii) documenting and tracking compliance with procedures over time; (iii) capturing in-process data for statistical process control purposes (e.g., heat input measurements); and (iv) identifying welders needing additional training. The system of the present invention provides the unique benefit of enabling the determination of compliance with various accepted welding procedures.

The present invention, in various exemplary embodiments, measures torch motion and gathers process data during welding exercises using a single or multiple camera tracking system based on point cloud image analysis. This invention is applicable to a wide range of processes including, but not necessarily limited to, GMAW, FCAW, SMAW, GTAW, and cutting. The invention is expandable to a range of work-piece configurations, including large sizes, various joint type, pipe, plate, and complex shapes. Measured parameters include work angle, travel angle, tool standoff, travel speed, bead placement, weave, voltage, current, wire feed speed, and arc length. The training component of the present invention may be pre-populated with specific welding procedures or it may be customized by an instructor. Data is automatically saved and recorded, a post-weld analysis scores performance, and progress is tracked over time. This system may be used throughout an entire welding training program and may include both in-helmet and on-screen feedback. With reference now to the Figures, one or more specific embodiments of this invention shall be described in greater detail.

As shown in FIG. 1, in an exemplary embodiment of the present invention, the basic flow of information through data generating component 100, data capturing component 200, and data processing (and visualization) component 300 of weld characterization system 10 occurs in six basic steps: (1) image capture 110; (2) image processing 112; (3) input of arc weld data 210, such as known or preferred weld parameters; (4) data processing 212; (5) data storage 214; and (5) data display 310. Image capture step 110 includes capturing images of target 98 (which typically includes at least two point markers located in a fixed geometric relationship to one another) with one or more off-the shelf high-speed-vision cameras, where the output aspect typically includes creating of an image file at over 100 frames per second. The input aspect of image processing step 112 includes frame-by-frame point cloud analysis of a rigid body that includes three or more point markets (i.e., the calibrated target). Upon recognition of a known rigid body, position and orientation are calculated relative to the camera origin and the "trained" rigid body orientation. Capturing and comparing the images from two or more cameras allows for a substantially accurate determination of the rigid body position and orientation in three-dimensional space. Images are typically processed at a rate of more than 10 times per second. The output aspect of image processing step 112 includes creation of a data array that includes x-axis, y-axis, and z-axis positional data and roll, pitch, and yaw orientation data, as well as time stamps and software flags. The text file may be streamed or sent at a desired frequency. The input aspect of data processing step 212 includes raw positional and orientation data typically requested at a predetermined rate, while the output aspect includes transforming this raw data into useful welding parameters with algorithms specific to a selected process and joint type. The input aspect of data storage step 214 includes storing welding trial data as a *.dat file, while the output aspect includes saving the data for review and tracking, saving the date for review on a monitor at a later time, and/or reviewing the progress of the student at a later time. Student progress may include total practice time, total arc time, total arc starts, and individual parameter-specific performance over time. The input aspect of data display step 310 includes welding trial data that further includes work angle, travel angle, tool standoff, travel speed, bead placement, weave, voltage, current, wire-feed speed, while the output aspect involves data that may viewed on a monitor, in-helmet display, heads-up display, or combinations thereof, wherein parameters are plotted on a time-based axis and compared to upper and lower thresholds or preferred variations, such as those trained by recording the motions of an expert welder. Current and voltage may be measured in conjunction with travel speed to determine heat input and the welding process parameters may be used to estimate arc length. Position data may be transformed into weld start position, weld stop position, weld length, weld sequence, welding progression, or combinations thereof and current and voltage may be measured in conjunction with travel speed to determine heat input.

Figure 2:
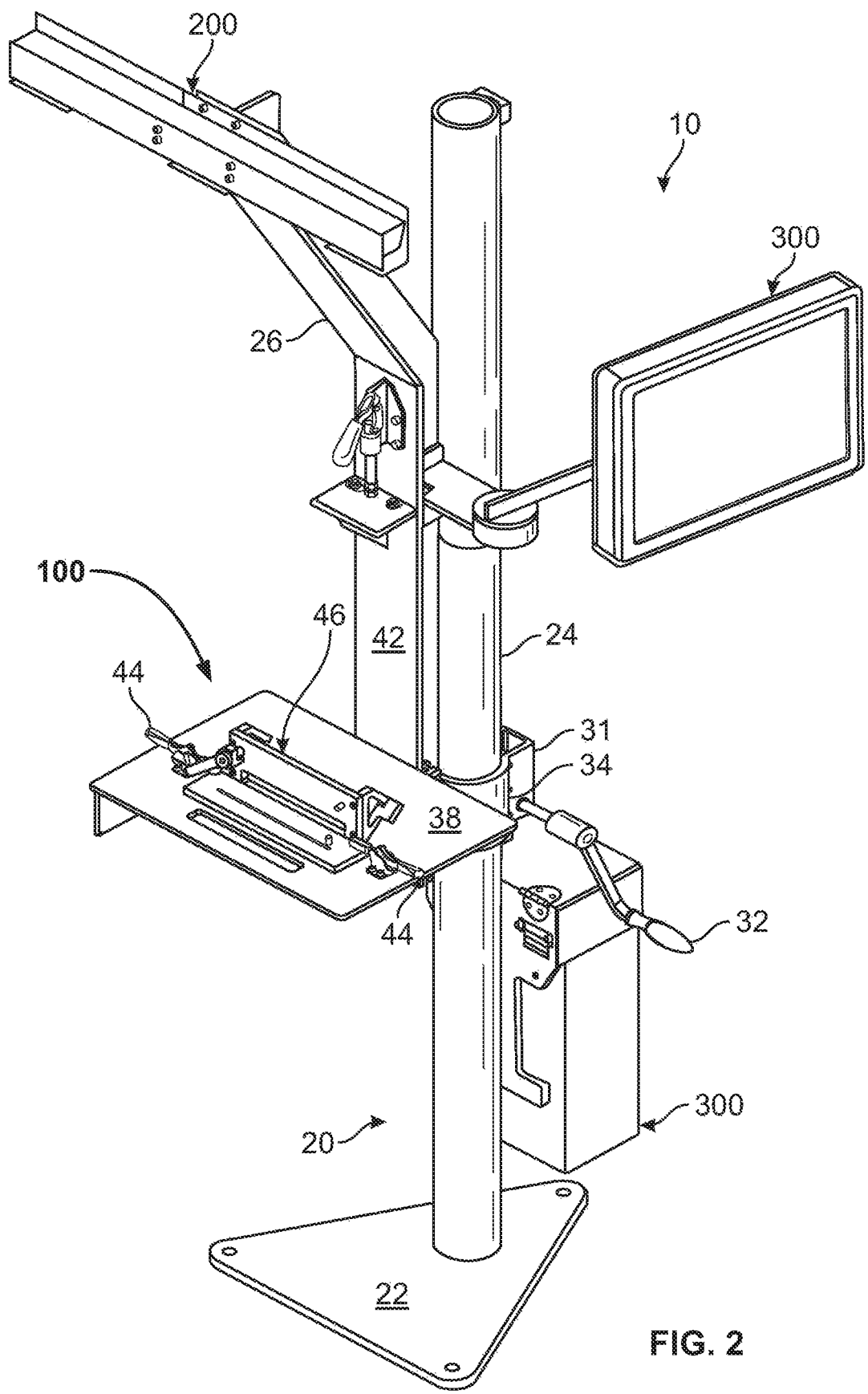
FIG. 2 provides an isometric view of a portable or semi-portable system for characterizing manual welding operations, in accordance with an exemplary embodiment of the present invention.

FIGS. 2-5 provide illustrative views of weld characterization system 10 in accordance with an exemplary embodiment the present invention. As shown in FIG. 2, portable training stand 20 includes a substantially flat base 22 for contact with a floor or other horizontal substrate, rigid vertical support column 24, camera or imaging device support 26, and rack and pinion assembly 31 for adjusting the height of imaging device support 26. In most embodiments, weld characterization system 10 is intended to be portable or at least moveable from one location to another, therefore the overall footprint of base 22 is relatively small to permit maximum flexibility with regard to installation and use. As shown in FIG. 2-6, weld characterization system 10 may be used for training exercises that include flat, horizontally or vertically oriented workpieces. In the exemplary embodiments shown in the Figures, training stand 20 is depicted as a unitary or integrated structure that is capable of supporting the other components of system. In other embodiments, stand 20 is absent and the various components of the system are supported by whatever suitable structural or supportive means may be available. Thus, within the context of this invention, "stand" 20 is defined as any single structure or, alternately, multiple structures that are capable of supporting the components of weld characterization system 10.

Figure 3:
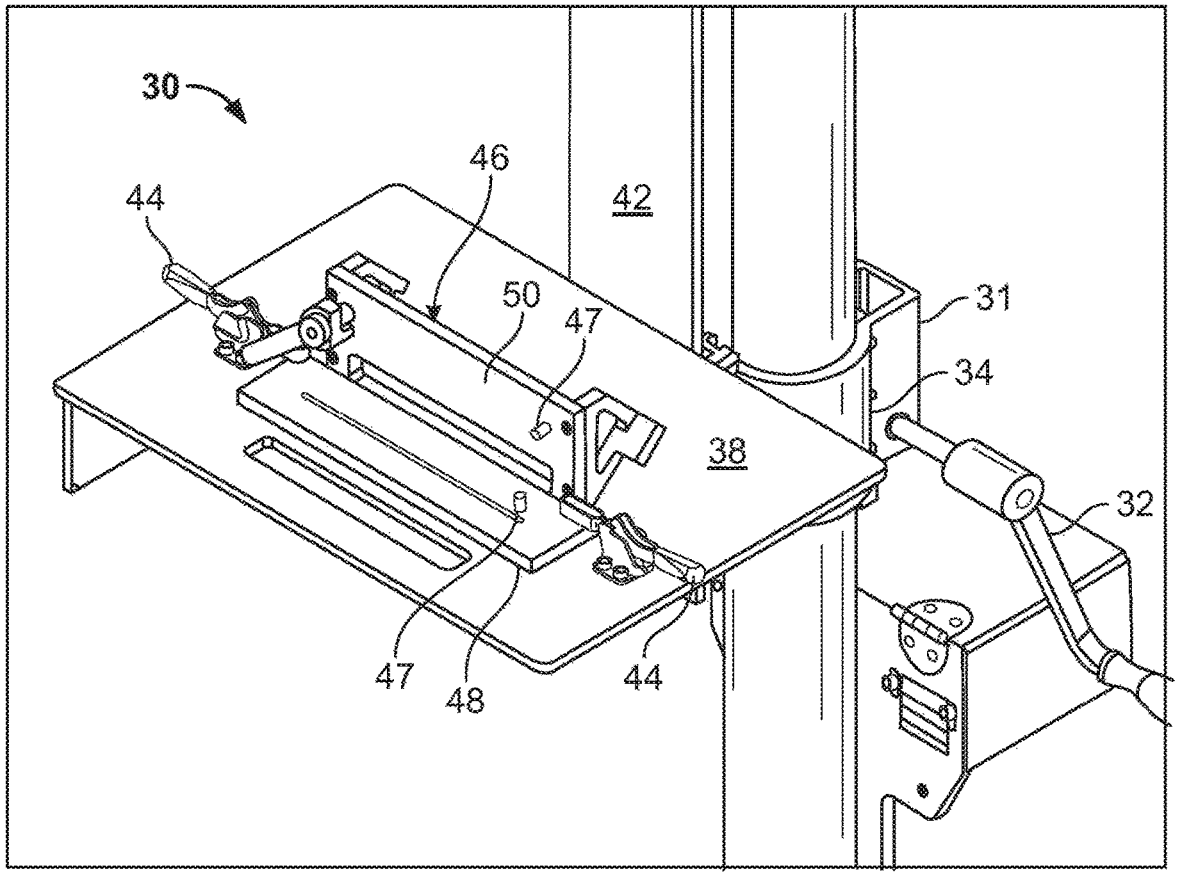
FIG. 3 provides an isometric view of the flat assembly of the system of FIG. 2.
Figure 4:
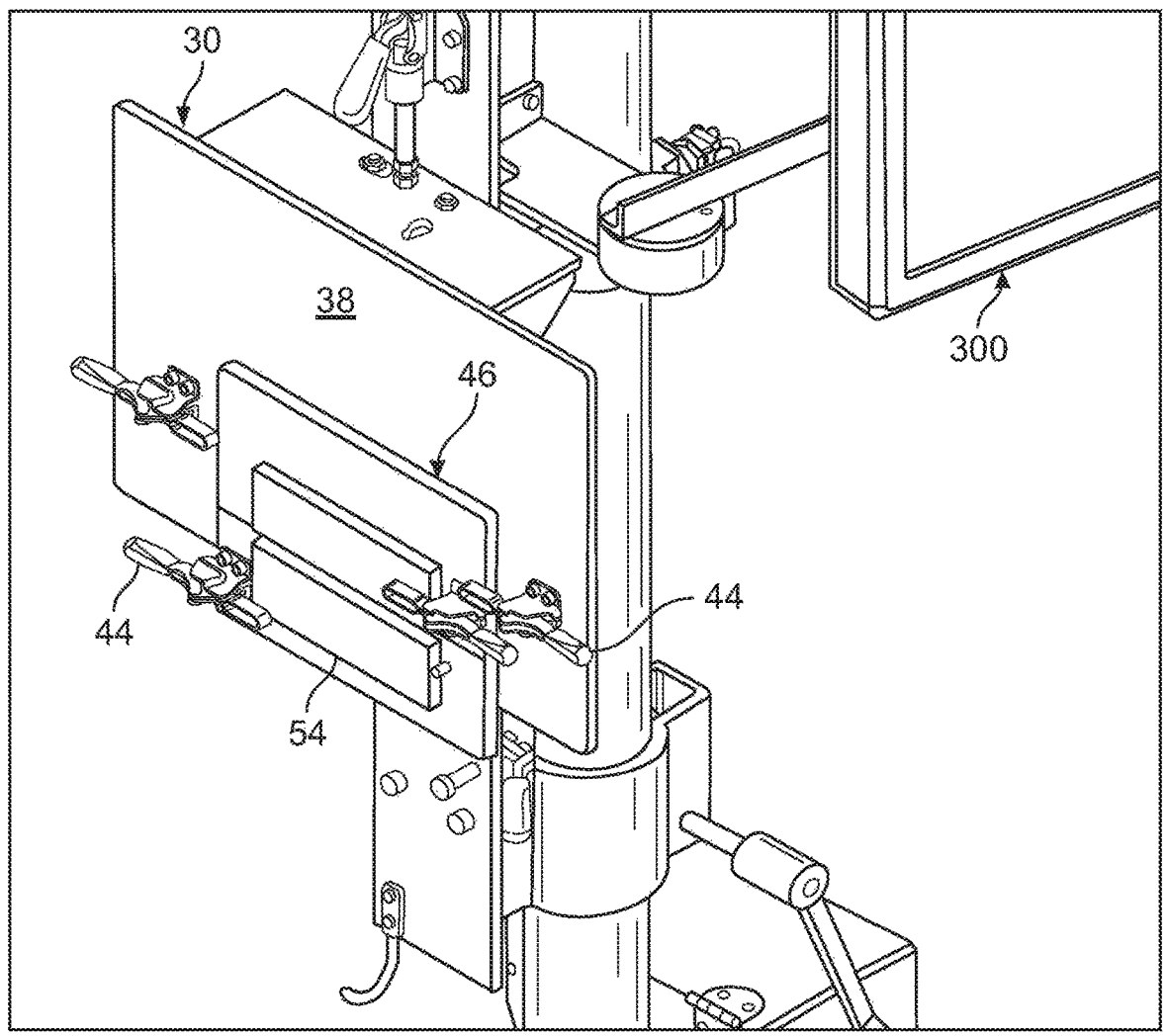
FIG. 4 provides an isometric view of the horizontal assembly of the system of FIG. 2.
Figure 5:
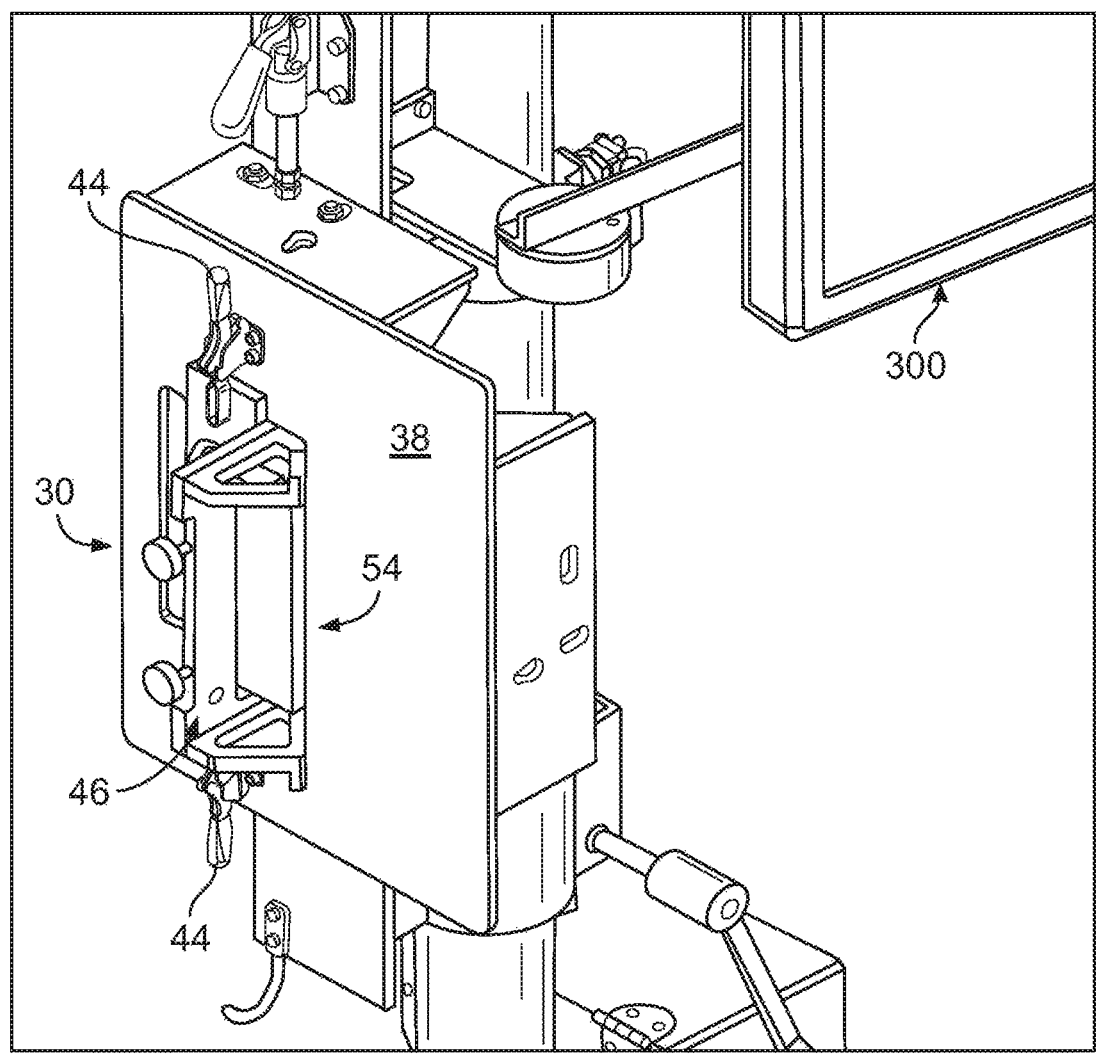
FIG. 5 provides an isometric view of the vertical assembly of the system of FIG. 2.

With to FIGS. 2-3, certain welding exercises will utilize a flat assembly 30, which is slidably attached to vertical support column 24 by collar 34, which slides upward or downward on support column 24. Collar 34 is further supported on column 24 by rack and pinion 31, which includes shaft 32 for moving rack and pinion assembly 31 upward or downward on support column 24. Flat assembly 30 includes training platform 38, which is supported by one or more brackets (not visible). In some embodiments, a shield 42 is attached to training platform 38 for protecting the surface of support column 24 from heat damage. Training platform 38 further includes at least one clamp 44 for securing weld position-specific fixture/jig 46 to the surface of the training platform. The structural configuration or general characteristics of weld position-specific jig 46 are variable based on the type of weld process that is the subject of a particular welding exercise, and in FIGS. 2-3, fixture 46 is configured for a fillet weld exercise. In the exemplary embodiment shown in FIGS. 2-3, first 48 and second 50 structural components of weld position-specific fixture 46 are set at right angles to one another. Position-specific fixture 46 may include one or more pegs 47 for facilitating proper placement of a weld coupon on the fixture. The characteristics of any weld coupon (workpiece) 54 used with system 10 are variable based on the type of manual welding process that is the subject of a particular training exercise and in the exemplary embodiment shown in the FIGS. 7-8, first 56 and second 58 portions of weld coupon 54 are also set at right angles to one another. With reference to FIGS. 4-5, certain other welding exercises will utilize a horizontal assembly 30 (see FIG. 4) or a vertical assembly 30 (see FIG. 5). In FIG. 4, horizontal assembly 30 supports butt fixture 46, which holds workpiece 54 in the proper position for a butt weld exercise. In FIG. 5, vertical assembly 30 supports vertical fixture 46, which holds workpiece 54 in the proper position for a lap weld exercise.

Data processing component 300 of the present invention typically includes at least one computer for receiving and analyzing information captured by the data capturing component 200, which itself includes at least one digital camera contained in a protective housing. During operation of weld characterization system 10, this computer is typically running software that includes a training regimen module, an image processing and rigid body analysis module, and a data processing module. The training regimen module includes a variety of weld types and a series of acceptable welding process parameters associated with creating each weld type. Any number of known or AWS weld joint types and the acceptable parameters associated with these weld joint types may be included in the training regimen module, which is accessed and configured by a course instructor prior to the beginning of a training exercise. The weld process and/or type selected by the instructor determine which weld process-specific fixture, calibration device, and weld coupon are used for any given training exercise. The object recognition module is operative to train the system to recognize a known rigid body target 98 (which includes two or more point markers) and for then to use target 98 to calculate positional and orientation data for welding gun 90 as an actual manual weld is completed by a trainee. The data processing module compares the information in the training regimen module to the information processed by the object recognition module and outputs the comparative data to a display device such as a monitor or head-up display. The monitor allows the trainee to visualize the processed data in real time and the visualized data is operative to provide the trainee with useful feedback regarding the characteristics and quality of the weld. The visual interface of weld characterization system 10 may include a variety of features related to the input of information, login, setup, calibration, practice, analysis, and progress tracking. The analysis screen typically displays the welding parameters found in the training regimen module, including (but not limited to) work angle, travel angle, tool standoff, travel speed, bead placement, weave, voltage, current, wire-feed speed, and arc length. Multiple display variations are possible with the present invention.

In most, if not all instances, weld characterization system 10 will be subjected to a series of calibration steps/processes prior to use. Some of the aspects of the system calibration will typically be performed by the manufacturer of system 10 prior to delivery to a customer and other aspects of the system calibration will typically be performed by the user of weld characterization system 10 prior to any welding training exercises. System calibration typically involves two related and integral calibration processes: (i) determining the three-dimensional position and orientation of the operation path to be created on a workpiece for each joint/position combination to be used in various welding training exercises; and (ii) determining the three-dimensional position and orientation of the welding tool by calculating the relationship between a plurality of reflective (passive) or light emitting (active) point markers located on target 98 and at least two key points represented by point markers located on the welding tool 90.

Figure 6:
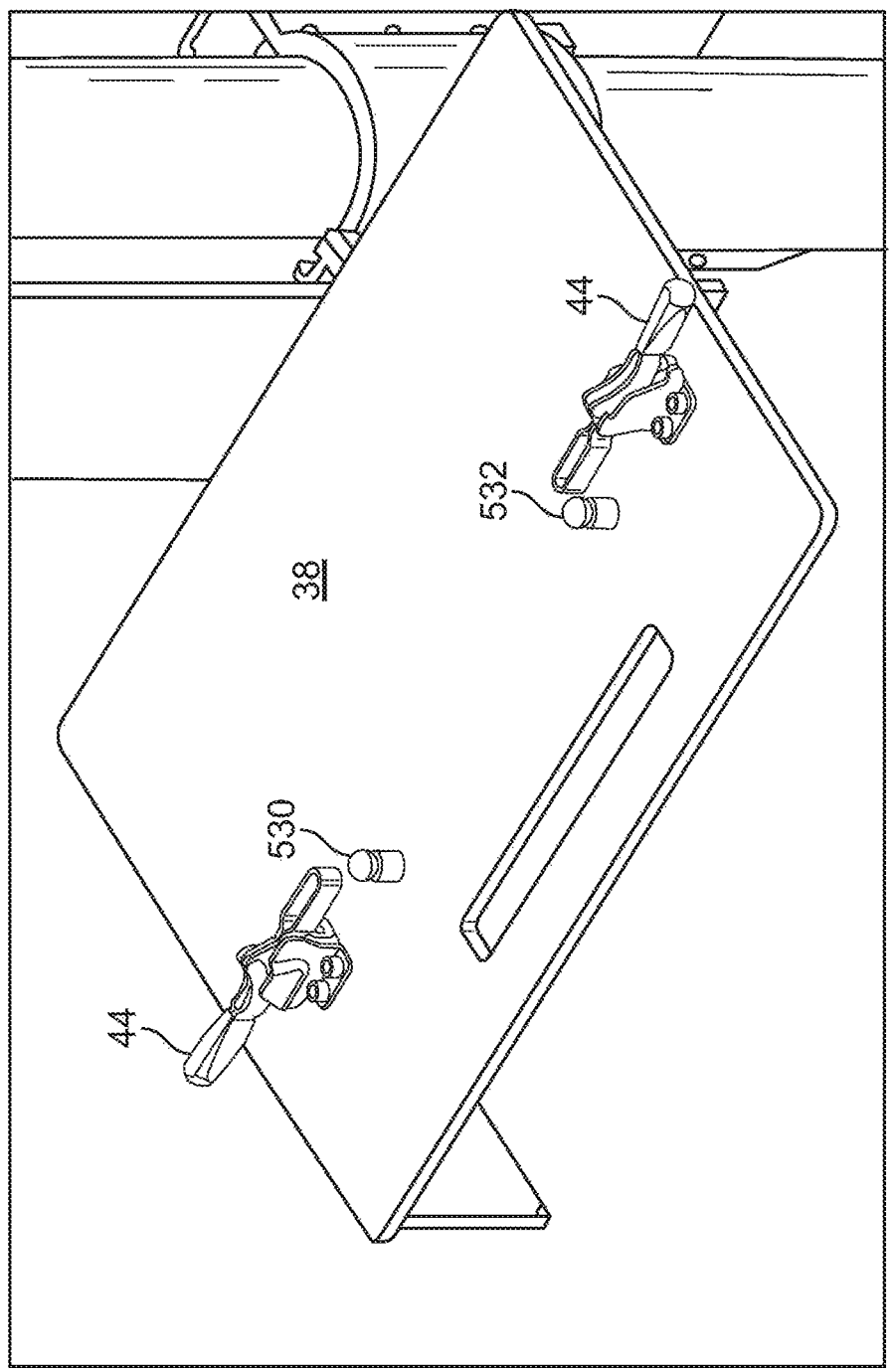
FIG. 6 illustrates the placement of two point markers on the flat assembly of FIG. 2.
Figure 7:
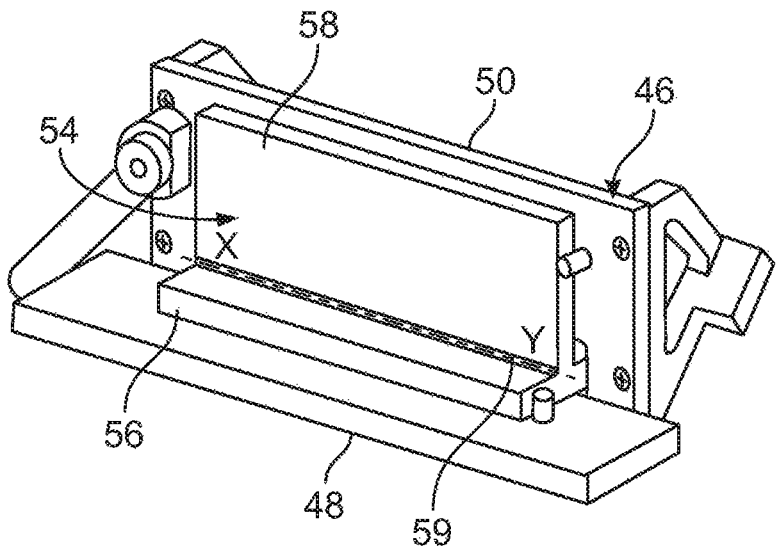
FIG. 7 illustrates an exemplary workpiece operation path.
Figure 8:
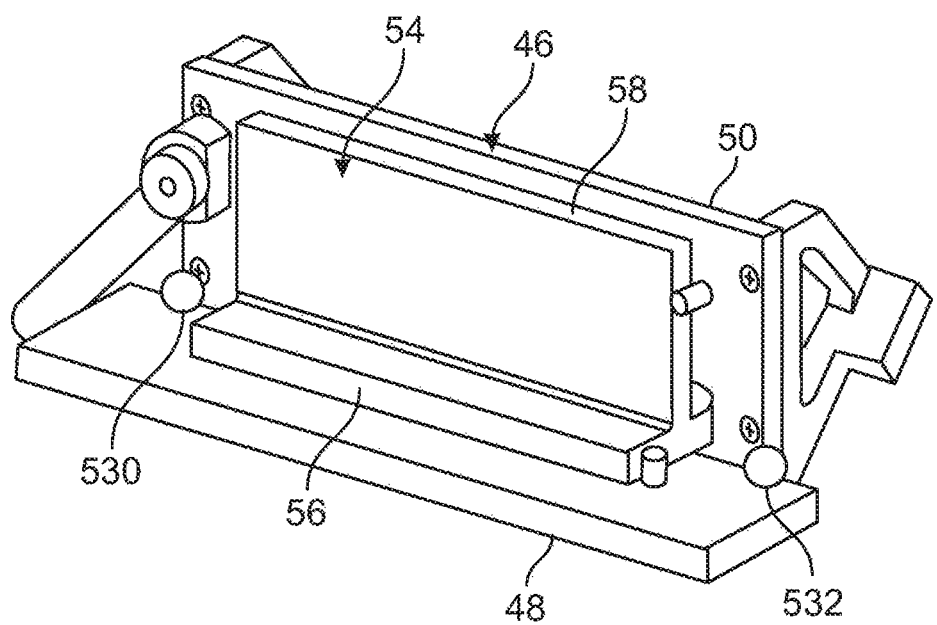
FIG. 8 illustrates the placement of two active or passive point markers on an exemplary workpiece for determining a workpiece operation path.

The first calibration aspect of this invention typically involves the calibration of the welding operation with respect to the global coordinate system, i.e., relative to the other structural components of weld characterization system 10 and the three-dimensional space occupied thereby. Prior to tracking/characterizing a manual welding exercise, the global coordinates of each desired operation path (i.e., vector) on any given workpiece will be determined. In most embodiments, this is a factory-executed calibration process that will include corresponding configuration files stored on data processing component 200. To obtain the desired vectors, a calibration device containing active or passive markers may be inserted on at least two locating markers in each of the three possible platform positions (i.e., flat, horizontal, and vertical). FIGS. 6-8 illustrate this calibration step in one possible platform position. Joint-specific fixture 46 includes first and second structural components 48 (horizontal) and 50 (vertical), respectively. Weld coupon or workpiece 54 includes first and second portions 56 (horizontal) and 58 (vertical), respectively. Workpiece operation path 59 extends from point X to point Y and is shown in broken line in FIG. 7. Locating point markers 530 and 532 are placed as shown in FIG. 6 (and FIG. 8) and the location of each marker is obtained using data capturing component 100, which in this embodiment utilizes Optitrack Tracking Tools (NaturalPoint, Inc.) or a similar commercially available or proprietary hardware/software system that provides three-dimensional marker and six degrees of freedom object motion tracking in real time. Such technologies typically utilize reflective and/or light emitting point markers arranged in predetermined patterns to create point clouds that are interpreted by system imaging hardware and system software as "rigid bodies", although other suitable methodologies are compatible with this invention.

Figure 9:
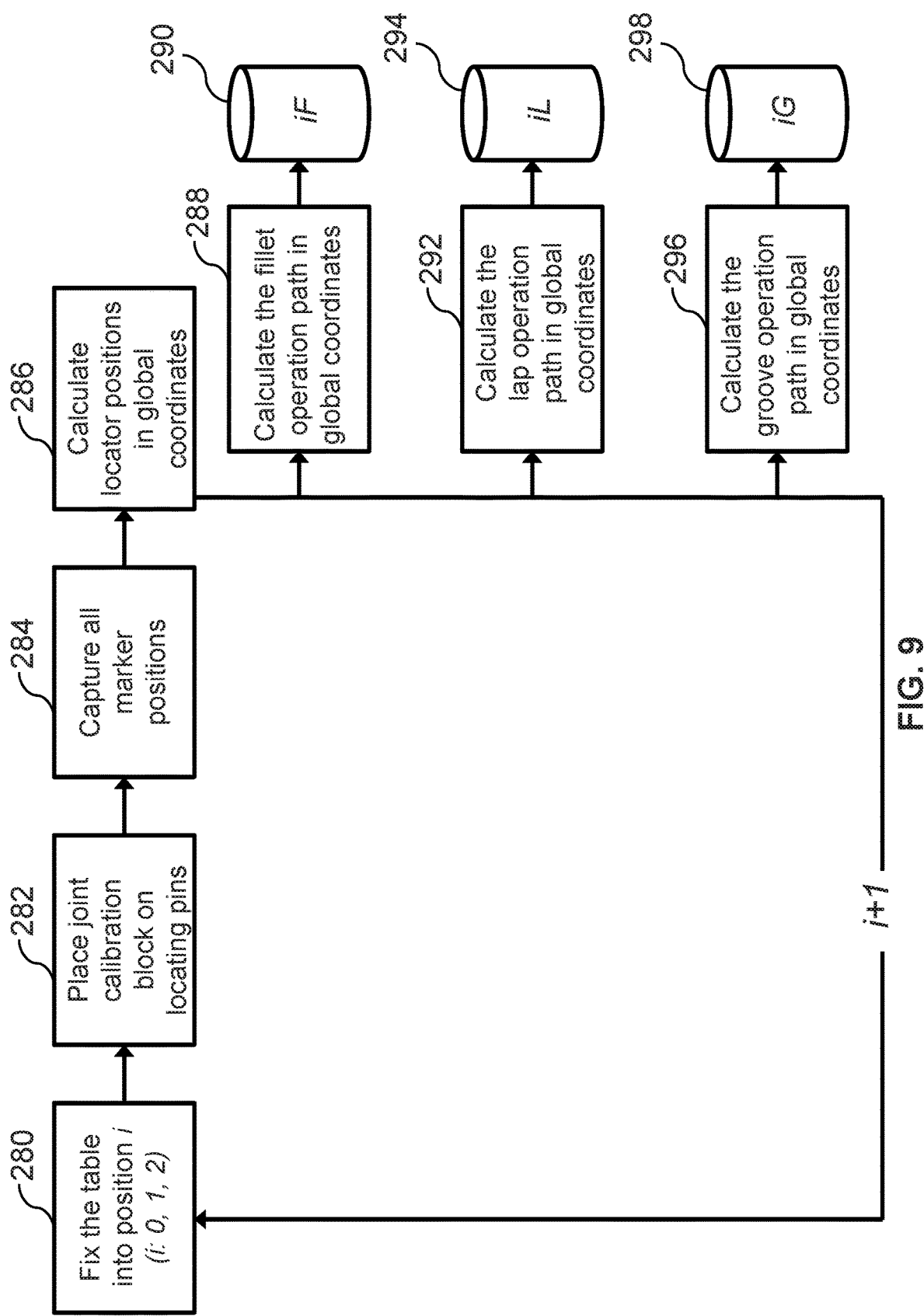
FIG. 9 is a flowchart detailing the process steps involved in an exemplary embodiment of a first calibration component of the present invention.

In the calibration process represented by the flowchart of FIG. 9, table 38 is fixed into position i (0,1,2) at step 280; a calibration device is placed on locating pins at step 282; all marker positions are captured at step 284; coordinates for the locator positions are calculated at step 286; coordinates for the fillet operation path are calculated at step 288 and stored at 290; coordinates for the lap operation path are calculated at step 292 and stored at 294; and coordinates for the groove operation path are calculated at step 296 and stored at 298. All coordinates are calculated relative to the three dimensional space viewable by data capturing component 200.

In one embodiment of this invention, the position and orientation of the work-piece is calibrated through the application of two or more passive or active point markers to a calibration device that is placed at a known translational and rotational offset to a fixture that holds the work-piece at a known translational and rotational offset. In another embodiment of this invention, the position and orientation of the work-piece is calibrated through the application of two or more passive or active point markers to a fixture that holds the work-piece at a known translational and rotational offset. In still other embodiments, the workpiece is non-linear, and the position and orientation thereof may be mapped using a calibration tool with two or more passive or active point markers and stored for later use. The position and orientation of the work-piece operation path may undergo a pre-determined translational and rotational offset from its original calibration plane based on the sequence steps in the overall work operation.

Important tool manipulation parameters such as position, orientation, velocity, acceleration, and spatial relationship to the work-piece operation path may be determined from the analysis of consecutive tool positions and orientations over time and the various work-piece operation paths described above. Tool manipulation parameters may be compared with pre-determined preferred values to determine deviations from known and preferred procedures. Tool manipulation parameters may also combined with other manufacturing process parameters to determine deviations from preferred procedures and these deviations may be used for assessing skill level, providing feedback for training, assessing progress toward a skill goal, or for quality control purposes. Recorded motion parameters relative to the workpiece operation path may be aggregated from multiple operations for statistical process control purposes. Deviations from preferred procedures may be aggregated from multiple operations for statistical process control purposes. Important tool manipulation parameters and tool positions and orientations with respect to the workpiece operation path may also be recorded for establishing a signature of an experienced operator's motions to be used as a baseline for assessing compliance with preferred procedures.

Figure 10:
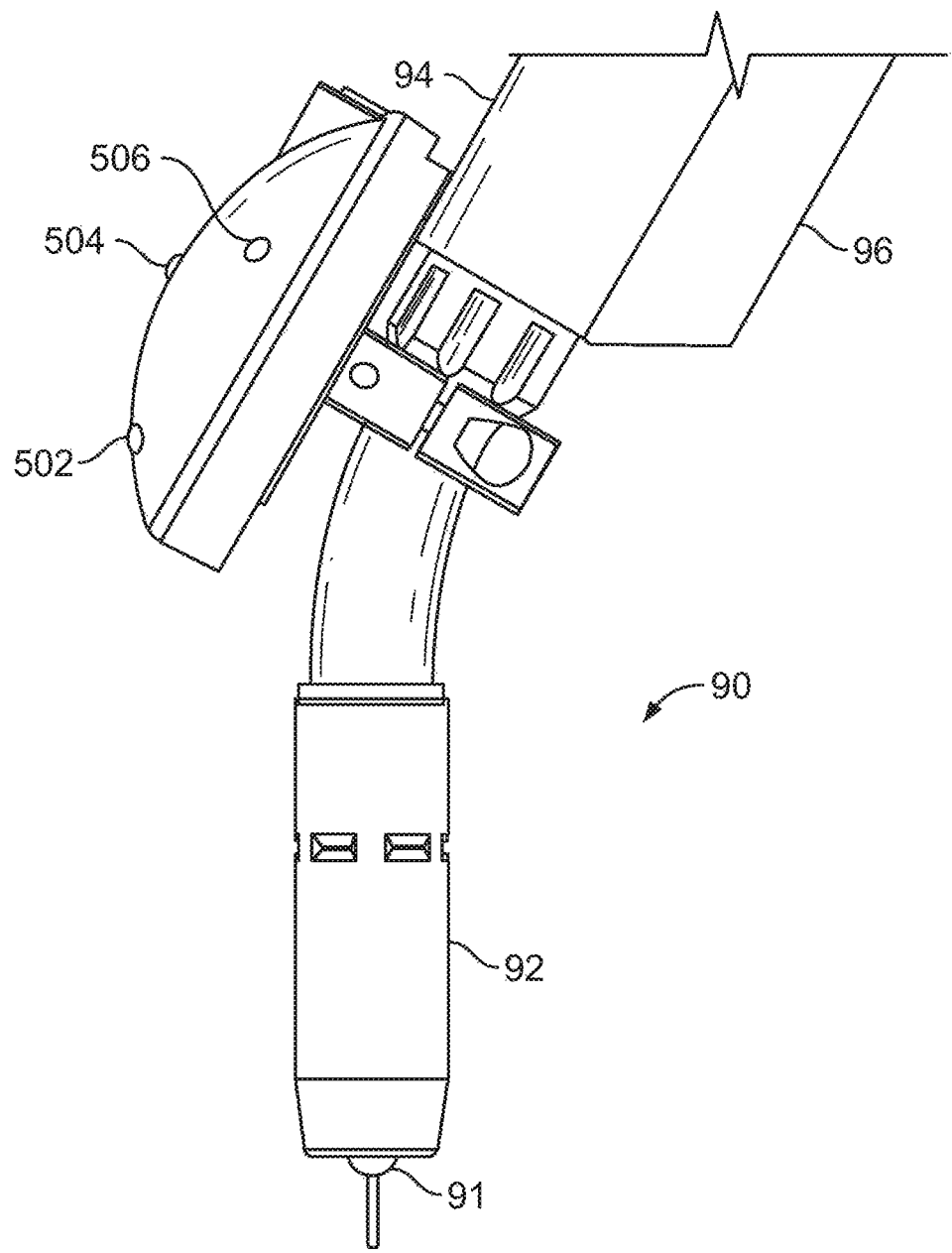
FIG. 10 illustrates the welding tool of an exemplary embodiment of this invention showing the placement of the point markers used to define the rigid body.
Figure 11:
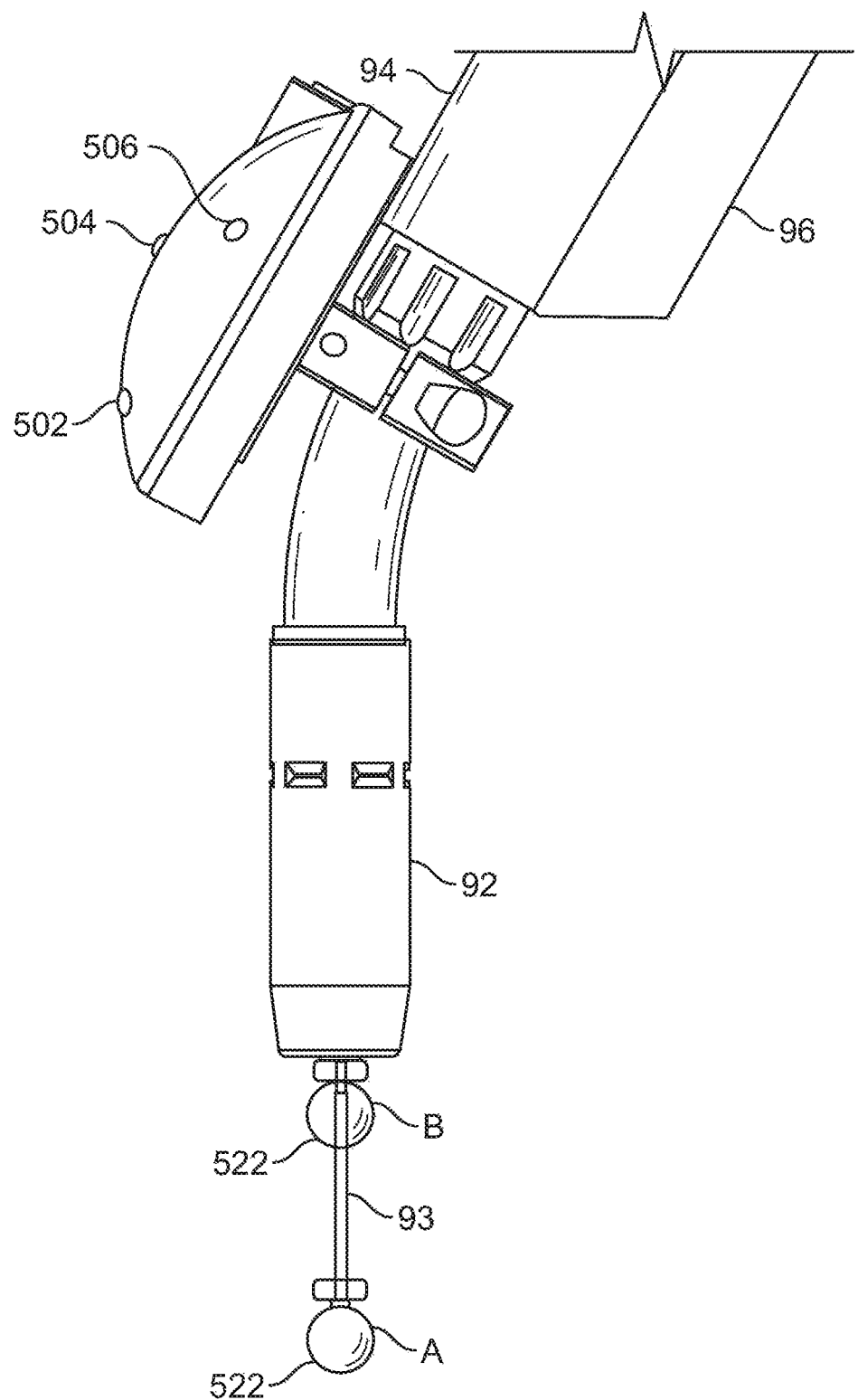
FIG. 11 illustrates the welding tool of an exemplary embodiment of this invention showing the placement of the point markers used to define the tool vector and the rigid body.

The second calibration aspect typically involves the calibration of welding tool 90 with respect to target 98. "Welding" tool 90 is typically a welding torch or gun or SMAW electrode holder, but may also be any number of other implements including a soldering iron, cutting torch, forming tool, material removal tool, paint gun, or wrench. With reference to FIGS. 10-11, welding gun/tool 90 includes tool point 91, nozzle 92, body 94, trigger 96, and target 98. Tool calibration device 93, which includes two integrated active or passive point markers in the A and B positions (see FIG. 11) is attached to or inserted into nozzle 92. A rigid body point cloud (i.e., a "rigid body") is constructed by attaching active or passive point markers 502, 504, and 506 (and additional point markers) to the upper surface of target 98 (other placements are possible). Target 98 may include a power input if the point markers used are active and require a power source. Data capturing component 200 uses Optitrack Tracking Tools (NaturalPoint, Inc.) or similar hardware/software to locate the rigid body and point markers 522 (A) and 520 (B), which represent the location of tool vector 524. These positions can be extracted from the software of system 10 and the relationship between point markers A and B and the rigid body can be calculated.

Figure 12:
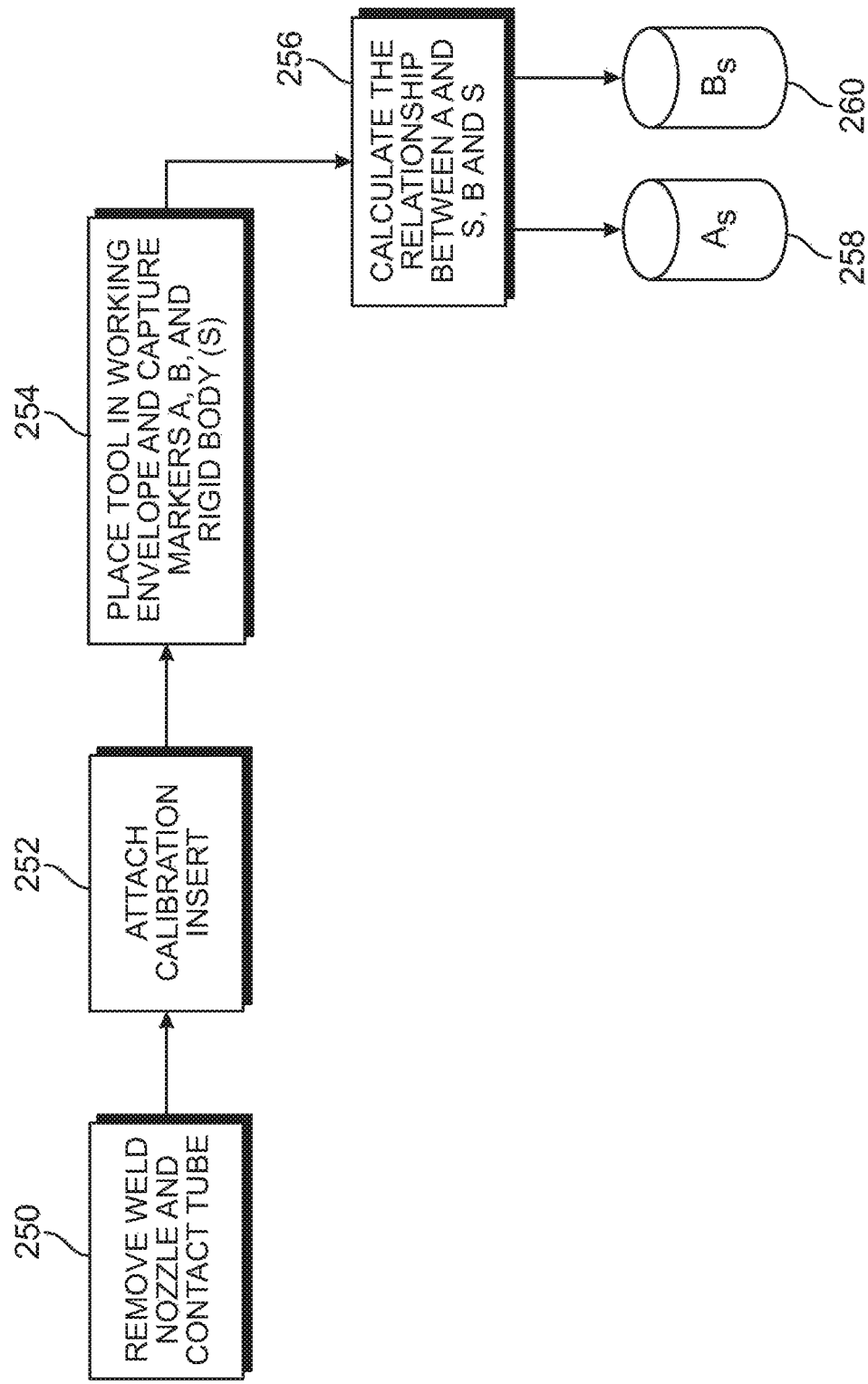
FIG. 12 is a flowchart detailing the process steps involved in an exemplary embodiment of a second calibration component of the present invention.

In the calibration process represented by the flowchart of FIG. 12, weld nozzle 92 and the contact tube are removed at step 250; the calibration device is inserted into body 94 at step 252; weld tool 90 is placed in the working envelope and rigid body 500 (designated as "S" in FIG. 11) and point markers A and B are captured by data capturing component 100; the relationships between A and S and B and S are calculated at step 256; relationship data for As is stored at 258; and relationship data for Bs is stored at 260.

In one embodiment of this invention, calibration of the tool point and tool vector is performed through the application of two or more passive or active point markers to the calibration device at locations along the tool vector with a known offset to the tool point. In another embodiment, calibration of the tool point and tool vector is performed by inserting the tool into a calibration block of known position and orientation relative to the work-piece. With regard to the rigid body defined by the point markers (e.g., 502, 504, 506), in one embodiment, the passive or active point markers are affixed to the tool in in a multi-faceted manner so that a wide range of rotation and orientation changes can be accommodated within the field of view of the imaging system. In another embodiment, the passive or active point markers are affixed to the tool in a spherical manner so that a wide range of rotation and orientation changes can be accommodated within the field of view of the imaging system. In still another embodiment, the passive or active point markers are affixed to the tool in a ring shape so that a wide range of rotation and orientation changes can be accommodated within the field of view of the imaging system.

Numerous additional useful features may be incorporated into the present invention. For example, for purposes of image filtering, band-pass or high-pass filters may be incorporated into the optical sequence for each of the plurality of digital cameras in data capturing component 200 for permitting light from only the wavelengths which are reflected or emitted from the point markers to improve image signal-to-noise ratio. Spurious data may be rejected by analyzing only image information obtained from within a dynamic region of interest having a limited offset from a previously known rigid-body locality. This dynamic region of interest may be incorporated into or otherwise predefined (i.e., preprogrammed as a box or region of width x and height y and centered on known positions of target 98) within the field of view of each digital camera such that image information is only processed from this predefined region. The region of interest will change as the rigid body moves and is therefore based on previously known locations of the rigid body. This approach allows the imaging system to view only pixels within the dynamic region of interest when searching for point markers while disregarding or blocking pixels in the larger image frame that are not included in the dynamic region of interest. Decreased processing time is a benefit of this aspect of the invention.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

The invention claimed is:

1. A method of characterizing a manual welding operation, the method comprising:
   providing a plurality of welding parameters for a manual welding operation;
   providing a workpiece to be welded by the manual welding operation;
   providing a calibration tool, the calibration tool including a plurality of first point markers;
   providing a welding tool, the welding tool including a plurality of second point markers arranged in a predetermined pattern;
   placing the workpiece on a weld platform;
   placing the calibration tool on the weld platform;
   capturing at least one image of the first point markers of the calibration tool on the weld platform;
   processing the at least one image of the first point markers on the calibration tool to determine a position and orientation of an operational path for the manual welding operation based on at least one of the welding parameters;
   manually welding the workpiece with the welding tool;
   capturing a plurality of images of the second point markers on the welding tool during the manual welding operation;
   processing the plurality of images of the second point markers on the welding tool to determine a position and orientation of the welding tool; and
   determining a plurality of characteristics of the manual welding operation based on the position and orientation of the operational path and the position and orientation of the welding tool,
   wherein the characteristics are selected from the group consisting of: a welding tool work angle, a welding tool travel angle, a welding tool travel speed, a bead placement, and a welding tool standoff distance.

2. The method of claim 1, wherein the weld platform includes a plurality of pins for removably attaching the calibration tool to the weld platform.

3. The method of claim 1, wherein the weld platform includes a plurality of clamps to secure the workpiece to the weld platform.

4. The method of claim 1, wherein the weld platform is connected to a stand.

5. The method of claim 4, further comprising displaying the characteristics on a monitor,
   wherein the monitor is coupled to the stand.

6. The method of claim 4, wherein the stand includes a vertical support.

7. The method of claim 6, wherein an angle of the weld platform relative to the vertical support is adjustable.

8. The method of claim 6, wherein a height of the weld platform relative to the vertical support is adjustable.

9. The method of claim 4, wherein an optical camera system is coupled to the stand, the optical camera system comprising a plurality of spatially-separated cameras, and
   wherein the optical camera system is operable to capture images containing at least one of the first point markers and the second point markers.

10. The method of claim 1, wherein the calibration tool is in physical contact with the workpiece on the weld platform.

11. The method of claim 1, wherein the second point markers are active point markers.

12. The method of claim 1, wherein the second point markers are light-emitting point markers.

13. The method of claim 1, further comprising comparing each of the welding tool work angle, the welding tool travel angle, the welding tool travel speed, the bead placement, and the welding tool standoff distance to a corresponding predetermined lower threshold value and a corresponding predetermined upper threshold value.

14. The method of claim 13, further comprising calculating a performance score for the manual welding operation based on the comparison of at least one of the welding tool work angle, the welding tool travel angle, the welding tool travel speed, the bead placement, and the welding tool standoff distance to the corresponding predetermined lower threshold value and the corresponding predetermined upper threshold value.

15. The method of claim 1, further comprising comparing each of the welding tool work angle, the welding tool travel angle, the welding tool travel speed, the bead placement, and the welding tool standoff distance to a corresponding predetermined preferred value.

16. The method of claim 15, further comprising calculating a performance score for the manual welding operation based on the comparison of at least one of the welding tool work angle, the welding tool travel angle, the welding tool travel speed, the bead placement, and the welding tool standoff distance to the corresponding predetermined preferred value.

17. The method of claim 1, wherein the welding tool includes more than three of the second point markers, and
wherein the predetermined pattern has no axis of symmetry.

* * * * *